US012285956B2

(12) United States Patent
Au et al.

(10) Patent No.: US 12,285,956 B2
(45) Date of Patent: Apr. 29, 2025

(54) MANUFACTURING AND QUALITY TESTING METHOD AND MANUFACTURING DEVICE FOR A PRINTED PRODUCT CAPABLE OF RESISTING ABNORMAL ENVIRONMENTAL CHANGES AND OPERATING IN ALL WEATHER AND SUITABLE FOR HYGIENE MANAGEMENT OPERATIONS, AND THE PRINTED PRODUCT

(71) Applicant: Man Yee Au, Hong Kong (HK)

(72) Inventors: Man Yee Au, Hong Kong (HK); Tak Kin Andrew Yan, Hong Kong (HK)

(73) Assignee: Man Yee Au Au, Hong Kong (HK)

( * ) Notice: Subject to any disclaimer, the term of this patent is extended or adjusted under 35 U.S.C. 154(b) by 427 days.

(21) Appl. No.: 17/628,557

(22) PCT Filed: Aug. 3, 2020

(86) PCT No.: PCT/CN2020/106531
§ 371 (c)(1),
(2) Date: Jan. 19, 2022

(87) PCT Pub. No.: WO2021/023145
PCT Pub. Date: Feb. 11, 2021

(65) Prior Publication Data

US 2022/0258490 A1 Aug. 18, 2022

(51) Int. Cl.
*B41J 2/195* (2006.01)
*B41J 3/407* (2006.01)
(Continued)

(52) U.S. Cl.
CPC ............... *B41J 2/195* (2013.01); *B41J 3/407* (2013.01); *B41M 1/34* (2013.01); *D21H 27/00* (2013.01)

(58) Field of Classification Search
CPC ........ D21H 17/23; D21H 17/57; D21H 17/59; D21H 17/60; D21H 17/72; B41M 1/34;
(Continued)

(56) References Cited

U.S. PATENT DOCUMENTS 4,244,728 A * 1/1981 DelliColli .............. A01N 25/10 504/366
5,177,169 A * 1/1993 Schroeder ............ C09J 197/005 530/502
(Continued)

FOREIGN PATENT DOCUMENTS

CN 108136802 A 6/2018
EP 4321336 A2 * 2/2024 ............... B27D 1/04
(Continued)

OTHER PUBLICATIONS

International search report of PCT Patent Application No. PCT/CN2020/106531 issued on Oct. 28, 2020.
(Continued)

*Primary Examiner* — Jose A Fortuna

(57) ABSTRACT

Provided are a manufacturing and quality testing method and a manufacturing device for a printed product capable of resisting abnormal environmental changes and operating in all weather and suitable for hygiene management operations, as well as the printed product, which relate to the technical field of printing. The manufacturing and quality testing method for the printed product includes the following steps: selecting a material for producing a content component of the product, the material having a structure that exhibits bi-characteristics; preparing a polyurethane adhesive; forming waterproof and weather-resistant images on a sheet material of the content component of the product by an appropriate printing method; performing connecting between the content component of the weather-resistant product and a cover; and sampling and testing are performed
(Continued)

to assure quality during the process of manufacturing the product capable of operating in all weather and capable of being disinfected and washed. The printed product can resist extreme temperatures and operate in all weather under abnormal environments, and is cost-effective and durable.

12 Claims, 11 Drawing Sheets

(51) Int. Cl.
*B41M 1/34* (2006.01)
*D21H 27/00* (2006.01)

(58) Field of Classification Search
CPC .. B41M 5/002; B41M 5/0064; B41M 5/0047; B41M 10/30; B41J 2/195; B41J 3/407; D21J 3/12; B41F 19/004
See application file for complete search history.

(56) References Cited

U.S. PATENT DOCUMENTS

| | | | | |
|---|---|---|---|---|
| 6,217,942 | B1 * | 4/2001 | Bolle | C09D 197/005 427/393 |
| 6,777,103 | B2 * | 8/2004 | Merkley | C04B 28/02 162/182 |
| 9,057,007 | B2 * | 6/2015 | Brizius | C09J 197/005 |
| 9,376,582 | B1 * | 6/2016 | Dannhauser | C09D 11/54 |
| 10,138,332 | B2 * | 11/2018 | Jansen | D01F 9/00 |
| 11,560,461 | B2 * | 1/2023 | Ford | D01F 6/14 |
| 11,981,904 | B2 * | 5/2024 | Karlen | C07K 14/415 |
| 2005/0016423 | A1 * | 1/2005 | Merkley | D21H 21/16 106/18.32 |
| 2008/0281020 | A1 | 11/2008 | Appel et al. | |
| 2015/0210904 | A1 | 7/2015 | Cothran et al. | |
| 2021/0246614 | A1 * | 8/2021 | Mattingly | D21H 21/16 |
| 2022/0161586 | A1 * | 5/2022 | Koerner | B41M 5/0011 |
| 2022/0258490 | A1 * | 8/2022 | Au | B41M 5/0047 |

FOREIGN PATENT DOCUMENTS

| | | | | | |
|---|---|---|---|---|---|
| EP | 4074782 | B1 | * | 3/2024 | B05D 1/02 |
| TW | 202345770 | A | * | 12/2023 | B29B 11/16 |
| WO | WO-2015052382 | A1 | * | 4/2015 | B29B 11/16 |
| WO | WO-2021023145 | A1 | * | 2/2021 | B41J 2/195 |

OTHER PUBLICATIONS

Extended European Search Report of Counterpart European Patent Application No. 20850146.0 issued on May 12, 2023.

* cited by examiner

MANUFACTURING AND QUALITY TESTING METHOD AND MANUFACTURING DEVICE FOR A PRINTED PRODUCT CAPABLE OF RESISTING ABNORMAL ENVIRONMENTAL CHANGES AND OPERATING IN ALL WEATHER AND SUITABLE FOR HYGIENE MANAGEMENT OPERATIONS, AND THE PRINTED PRODUCT

CROSS-REFERENCE TO RELATED APPLICATIONS

The present application claims the priority to U.S. patent application No. 62/883,053 filed with the USPTO on Aug. 5, 2019, entitled "Manufacturing method, Equipment and Quality Testing Methods for a Printed Matter that capable of Resisting Abnormal Changes, Suitable for All-weather Usages as well as Hygiene Management Operations", the entirety of which is incorporated herein by reference.

FIELD OF THE INVENTION

The present disclosure relates to the field of printing technology, and in particular, to a manufacturing and quality testing method and a manufacturing device for a printed product capable of resisting abnormal environmental changes and operating in all weather and suitable for hygiene management operations, and the printed product.

BACKGROUND OF THE INVENTION

Paper made from pulp is a common material for publications. Paper articles, especially those for young children, must be used very carefully because they are easily torn during turning of the pages. Special articles, for example, those that are waterproof, are synthesized from or made by a textile process from chemical composite materials, plastics, etc. In addition, printed products used on special occasions, for example, sports activities, industrial production lines, hygiene management and so on, are often subjected to extreme temperatures and abnormal environments, in which case various intrusive damage forces caused by turbulence induced by fluids varying from freezing to boiling, or turbulence of gases under sub-zero, high heat and steam conditions, can result in different damage to common printed products. Any of the above conditions can cause great challenges to paper products, resulting in destructive damage to the structure of paper and thus loss of durability of the paper, as a result of which the printed products cannot be reused.

There is thus a need in the publishing industry to create a printed product, to select a suitable material capable of permanently bearing printed images and to develop a durable binding method. The finished product cannot be damaged under extreme temperatures and abnormal environmental conditions, and the final product is suitable for use in all-weather environments and for multiple purposes, and hygiene management can be performed to continuously extend the service life of the product. This is the practicality of the present disclosure.

The printed product is suitable for the following applications.

1) The printed product can be used for outdoor sports or research purposes, for example, for ground or water/underwater activities at sub-zero temperatures, in hot weather and abnormal environments, such as in hot deserts, oceans or swimming pools, humid jungles or steam baths, where printed materials such as information guides, training manuals and the like will be subjected to extreme temperatures and abnormal environments.
2) The printed product can be used for children's books used in kindergartens or nursery schools which may be subjected to severe accidental pulling when being read, such as destructive friction, tearing, breaking, etc.
3) The printed product can be used in poor or abnormal working environments, such as kitchens, cold storage warehouses, garage repairs, etc. The product can be workshop manuals, record cards, data sheets, posters, etc. The product needs to be durable and particularly resistant to moisture, oil, stains on production lines, hot water, and ice storage space operations, and be reusable after being cleaned.
4) The printed product can be used in health care service, where items of this type need to be disinfected or washed regularly. During such operating processes, the items may be subjected to extreme temperatures such as freezing wind, hot air, steam, immersion in boiling hot water, and may be subjected to abnormal environments, namely tumbling caused by turbulence of liquid or airflow which has different degrees of destructive power.
5) The printed product can be used for children's toy books in the bath. Such toys should be capable of resisting physical destructive forces generated by severe fluid rolling during the bath.

In the business world, there are several publications that can be used as water-resistant books for leisurely reading in the bath, which are, for example, those published by Maria Carter and Culture & Arts that can be used in water environments on beaches. The material of these books is a synthetic paper (not a lignin fiber material) made of polypropylene which is a kind of semi-crystalline thermoplastic (polypropylene, PP). Additional special treatment such as corona discharge or applying a water-repellent liquid and an ink affinity agent and the like is also performed on the surface of the plastic to achieve waterproof and phase printing effects. Another type of bath books is young children's toys. Amazon lists a lot of such products that are made of plastic and sponge. These books are also non-fiber type of books.

It can be seen from the above that synthetic paper and plastic are often used to produce waterproof books. Maria Carter and Culture & Arts did not disclose technologies for producing their books, nor did they disclose solutions as to how their books could resist extreme temperatures such as varying from freezing to steam encountered during use as well as physical and mechanical destructive forces caused by severe abnormal environments during disinfection and washing, nor did they disclose quality testing methods for their books.

SUMMARY OF THE INVENTION

The embodiments of the present disclosure provide a manufacturing and quality testing method for a printed product capable of resisting abnormal environmental changes and operating in all weather and suitable for hygiene management operations, which can produce a printed product capable of resisting extreme temperatures and normal environments and having enhanced durability.

The embodiments of the present disclosure also provide a manufacturing device for a printed product capable of resisting abnormal environmental changes and operating in all weather and suitable for hygiene management operations, which can produce a printed product capable of resisting extreme temperatures and normal environments and having enhanced durability.

The embodiments of the present disclosure also provide a printed product capable of resisting abnormal environmental changes and operating in all weather and suitable for hygiene management operations, which can resist extreme temperatures and normal environments and has enhanced durability.

The embodiments of the present disclosure can be implemented as follows.

In the first aspect, the embodiments of the present disclosure provide a manufacturing and quality testing method for a printed product capable of resisting abnormal environmental changes and operating in all weather and suitable for hygiene management operations. The method includes the following steps.

In step 1, a material for producing a content component of the product is selected. The material has a structure that exhibits bi-characteristics which are rigidity and hydrophilicity.

i) Rigidity is provided by a waterproof fibrous tissue with a high stiffness which is formed by mixing and combining waterproof fiber filaments with an adhesive containing lignin. The lignin is a cross-linked phenol polymer and is thus combined with the fiber filaments to form a rigid structure.

ii) Hydrophilicity is provided by liquid-permeable micro-pores which need to be formed on the surface of the material when the material is produced.

In step 2, a polyurethane adhesive is prepared. The polyurethane adhesive is characterized in that during the chemically curing process of the adhesive, isocyanate and water vapor undergo chemical changes, unidirectionally transform into strong physical bonds, and then become cured to obtain a cured body. Chains of the bonds are characterized in that they are not to be damaged or broken when subjected to extreme temperatures, and thus are capable of resisting abnormal environmental changes, without their chemical changes being reversed which can cause physical disintegration of the chains of the bonds and thus damage the structure of the printed product. The cured body should be flexible in terms of its physical state and be greatly flexional when used. In order to reinforce the strength of the irreversible adhesive, waterproof glass fiber filaments with a maximum length of 15 mm may be mixed into the adhesive with a largest volume ratio of the waterproof glass fiber filaments to the adhesive being 50% to increase the adhesive ability and flexibility.

In step 3, waterproof and weather-resistant images are formed on a sheet material of the content component of the product by an appropriate single-side or double-side printing method. An ink used is a fluid of pigment particles containing micron pigment particles suspended in an aqueous or non-aqueous solution, or a fluid of dye containing the dye mixed in an aqueous or non-aqueous solution. The viscosity of the fluid is required to comply with the physical phenomenon of capillary action. During the printing process, the ink or a vaporized pigment becomes a steam and passes through the micro-pores on the sheet material and is drawn into a waterproof fiber tissue or gaps between the waterproof fiber filaments by the physical phenomenon of the capillary action, and then the ink or the vaporized pigment is naturally dried or cooled down, rendering the pigment particles or the dye solidified and permanently locked between the fiber filaments or yarns. The pigment particles or the dye does not melt when subjected to heat and its adhesion is thus achieved. This printing process can be used to print all components of the product.

In step 4, connecting between the content component of the weather-resistant product and a cover is performed. The connecting may be realized by means of a polyurethane adhesive, sewing, mechanical assembly, or a combination of two or three of the following processes.

i) A binding process in which a polyurethane adhesive is used is as follows. 1) A position to which the cover is to be connected is determined on printed inner page sheet materials, and slot-shaped openings or boundary holes are cut at the position with a rough cutter, until waterproof fiber filaments at a rough end of the rough cutter are exposed and become loose, by way of which stability and adhesion of a combination with the adhesive is enhanced. 2) The inner page sheet materials are folded into separate inner page groups. 3) The separate inner page groups are arranged according to a reading sequence to form the content component of the product. 4) The exposed loose waterproof fiber filaments of the sequentially arranged separate inner page groups are combined with the cover by means of the polyurethane adhesive. 5) Then an edge without the adhesive is cut to form a readable publication.

ii) A binding process in which sewing is used is as follows. 1) Multiple individual printed inner page sheet materials with printed images are folded into separate inner page groups. 2) The separate inner page groups are arranged according to a reading sequence to form the component of the product. 3) All the separate inner page groups are connected into one piece by a sewing process implemented manually or mechanically. 4) The one-piece separate inner page groups and the cover are connected together with the polyurethane adhesive. 5) Then an edge without the adhesive is cut to form a readable publication.

iii) A binding process in which sewing is used and an adhesive is not used is as follows. 1) Printed inner page sheet materials are folded into separate inner page groups. 2) A waterproof thread is passed through the inner pages and the cover that are overlapped by using a needle to connect the inner pages and the cover into one piece according to a specific threading rule in sewing. 3) A knot is tied at the end of the threading rule when the passing of the thread is completed so as to prevent disintegration of the publication. 4) An edge without the thread being passed through is cut to form a readable publication.

iv) A binding process is which mechanically tying assembly is used is as follows. 1) Printed inner page sheet materials are cut into separate sheets. 2) The cover and needed separate sheets are arranged according to a reading sequence to form a content component. 3) A hole is formed by punching or drilling along a position where a tying system is to be arranged. 4) Finally, a tying device is installed at the position of the hole to obtain a readable publication. The tying system may be permanently locked or unlockable, and in the latter case inner pages can be removed, added, or adjusted to change the reading order according to needs of a reader.

In Step 5, during the process of manufacturing the product capable of operating in all weather and capable of being disinfected and washed, sampling and testing are performed to assure quality. Items to be tested and qualification standards are as follows.

In order to ensure quality of the product, according to applications of the product, the test is performed at an expected temperature and in an expected environment under which the product is used. A test instrument is used to simulate destructive effects of stretching, shearing, compressing, peeling, tearing, bursting, and puncturing caused by rolling and rubbing produced under an extreme temperature and various abnormal environmental conditions. The instrument is a refrigerator providing a sub-zero temperature, a hot air heater, a steam vortex furnace, and a liquid boiling pot. Procedures of the tests and the qualification standards are as follows.

1) A temperature, an abnormal environment, and a test duration that are expected for the simulation operation are set according to the application of the product.
2) A suitable test instrument is selected to simulate the destructive rolling and friction produced under an extreme temperature and various abnormal environmental conditions.
3) A material to be tested with an appropriate size is prepared depending on the size of the simulation device. Or, the whole product is tested.
4) The temperature, the abnormal environment, and the test duration required by the test instruments are adjusted and then testing is performed.
5) Finally, it is analyzed whether testing results meet the standards. The items tested and their qualification standards are as follows.

i) Decomposition test of the material: The edge position of the material is checked visually with a magnifying glass. The fiber filaments should not be exposed or fall off, and the material should not be structurally broken or decomposed.

ii) Adhesion test of the ink: A color block used to monitor the amount of the ink used in the printing process is the measurement tool and measurement target of the test. If it is determined by a comparison that a difference between density readings on the color block before and after the test is not less than +/−0.05, it means that the ink is not washed off and the image does not fade.

iii) Physical bond test of the adhesive; It is visually checked whether the structure of the cured body of the irreversibly chemically changed adhesive is melt or disintegrated to cause the cover of the product and the one-piece separate inner page components to separate from each other.

iv) Test of the tying device system: It is visually checked whether structures of mechanical components are separated from each other, melted, or disintegrated.

In the second aspect, the embodiments of the present disclosure provide a manufacturing device for a printed product capable of resisting abnormal environmental changes and operating in all weather and suitable for hygiene management operations. The manufacturing device includes a printing device, a connecting device, and a test instrument.

The printing device is used to form waterproof and weather-resistant images on a sheet material of a content component of the product by an appropriate single-side or double-side printing method. An ink used in the printing device is a fluid of pigment particles containing micron pigment particles suspended in an aqueous or non-aqueous solution, or a fluid of a dye containing the dye mixed in an aqueous or non-aqueous solution. The viscosity of the fluid is required to comply with operation of the physical phenomenon of capillary action. During the printing process, the ink or a vaporized pigment becomes a steam and passes through the micro-pores on the sheet material and is drawn into a waterproof fiber tissue or gaps between waterproof fiber filaments by the physical phenomenon of the capillary action, and then the ink or the vaporized pigment is naturally dried or cooled down, rendering the pigment particles or the dye solidified and permanently locked between the fiber filaments or yarns. The pigment particles or the dye does not melt when subjected to heat and its adhesion is thus achieved. This printing process can be used to print all components of the product.

The content component of the product—has a structure that exhibits bi-characteristics which are rigidity and hydrophilicity.

i) Rigidity is provided by a waterproof fibrous tissue with a high stiffness which is formed by mixing and combining waterproof fiber filaments with an adhesive containing lignin. The lignin is a cross-linked phenol polymer and is thus combined with the fiber filaments to form a rigid structure.

ii) Hydrophilicity is provided by liquid-permeable micropores which are needed to be formed on the surface of the material when the material is produced.

The connecting device is used to perform connecting between the content component of the weather-resistant product- and a cover. The connecting device is used to realize the connecting by means of a polyurethane adhesive, sewing or mechanical assembly, or a combination of two or three types of the following processes.

i) A binding process in which a polyurethane adhesive is used is as follows. 1) A position to which the cover is to be connected is determined on printed inner page sheet materials, and slot-shaped openings or boundary holes are cut at the position with a rough cutter, until waterproof fiber filaments at a rough end of the rough cutter are exposed and become loose, by way of which stability and adhesion of a combination with the adhesive is enhanced. 2) The inner page sheet materials are folded into separate inner page groups. 3) The separate inner page groups are arranged according to a reading sequence to form the content component of the product. 4) The exposed loose waterproof fiber filaments of the sequentially arranged separate inner page groups are combined with the cover by means of the polyurethane adhesive. 5) Then an edge without the adhesive is cut to form a readable publication.

ii) A binding process in which sewing is used is as follows. 1) Multiple individual printed inner page sheet materials with printed images are folded into separate inner page groups. 2) The separate inner page groups are arranged according to a reading sequence to form the component of the product. 3) All the separate inner page groups are connected into one piece by a sewing process implemented manually or mechanically. 4) The one-piece separate inner page groups and the cover are connected together with the polyurethane adhesive. 5) Then an edge without the adhesive is cut to form a readable publication.

iii) A binding process in which sewing is used and an adhesive is not used is as follows. 1) Printed inner page sheet materials are folded into separate inner page groups. 2) A waterproof thread is passed through the inner pages and the cover that are overlapped by using a needle to connect the inner pages and the cover into one piece according to a specific threading rule in sewing. 3) A knot is tied at the end of the threading rule when the passing of the thread is completed so as to prevent disintegration of the publication. 4) An edge without the threading rule is cut to form a readable publication.

iv) A binding process is which mechanically tying assembly is used is as follows. 1) Printed inner page sheet materials are cut into separate sheets. 2) The cover and needed separate sheets are arranged according to a reading sequence to form a content component. 3) A hole is formed by punching or drilling along a position where a tying system is to be arranged. 4) Finally, a tying device is installed at the position of the hole to obtain a readable publication. The tying system may be permanently locked or unlockable, and in the latter case inner pages can be removed, added, or adjusted to change the reading order according to needs of a reader.

The polyurethane adhesive is characterized in that, during the chemically curing process of the adhesive, isocyanate and water vapor undergo chemical changes, unidirectionally transform into strong physical bonds, and then become cured to obtain a cured body. Chains of the bonds are characterized in that they are not to be damaged or broken when subjected to extreme temperatures, and thus are capable of resisting abnormal environmental changes, without their chemical changes being reversed which can cause physical disintegration of the chains of the bonds and thus damage the structure of the printed product. The cured body should be flexible in terms of its physical state and be greatly flexional when used. In order to reinforce the strength of the irreversible adhesive, waterproof glass fiber filaments with a maximum length of 15 mm may be mixed into the adhesive with a largest volume ratio of the waterproof glass fiber filaments to the adhesive being 50% to increase the adhesive ability and flexibility.

The test instrument is used to perform sampling and testing to assure quality during the process of manufacturing the product capable of operating in all weather and capable of being disinfected and washed. In order to ensure quality of the product, according to applications of the product, the test is performed at an expected temperature and in an environment under which the product is used, the test instrument is used to simulate destructive effects of stretching, shearing, compressing, peeling, tearing, bursting, and puncturing caused by rolling and rubbing produced under an extreme temperature and various abnormal environmental conditions. The test instrument includes a refrigerator providing a sub-zero temperature, a hot air heater, a steam vortex furnace, and a liquid boiling pot.

The test instrument meets the following test procedures and qualification standards.

1) A temperature, an abnormal environment, and a test duration that are expected for the simulation operation are set according to the application of the product.
2) A suitable test instrument is selected to simulate the destructive rolling and friction produced under an extreme temperature and various abnormal environmental conditions.
3) A material to be tested with an appropriate size is prepared depending on the size of the simulation device. Or, the whole product is tested.
4) The temperature, the abnormal environment, and the test duration required by the test instruments are adjusted and then testing is performed.
5) Finally, it is analyzed whether testing results meet the standards. The items tested and their qualification standards are as follows.

i) Decomposition test of the material: The edge position of the material is checked visually with a magnifying glass. The fiber filaments should not be exposed or fall off, and the material should not be structurally broken or decomposed.

ii) Adhesion test of the ink: A color block used to monitor the amount of the ink used in the printing process is the measurement tool and measurement target of the test. If it is determined by a comparison that a difference between density readings on the color block before and after the test is not less than +/−0.05, it means that the ink is not washed off and the image does not fade.

iii) Physical bond test of the adhesive; It is visually checked whether the structure of the cured body of the irreversibly chemically changed adhesive is melt or disintegrated to cause the cover of the product and the one-piece separate inner page components to separate from each other.

iv) Test of the tying device system: It is visually checked whether structures of mechanical components are separated from each other, melted, or disintegrated.

In the third aspect, the embodiments of the present disclosure provide a printed product, which is produced by the above-mentioned manufacturing and quality testing method for a printed product capable of resisting abnormal environmental changes and operating in all weather and suitable for hygiene management operations.

The manufacturing and quality testing method for a printed product capable of resisting abnormal environmental changes and operating in all weather and suitable for hygiene management operations as well as the printed product according to the embodiments of the present disclosure bring the following beneficial effects.

The material of the printed product is a waterproof sheet material made from a strong, rigid and durable adhesive which is formed from paper-like fiber filaments and lignin having highly stable chemical bonds. During the process of producing the sheet material, micro-pores are formed by pressing on the surface, and the micro-pores can provide capillary action which makes the material hydrophilic, and thus there is no need to apply a water-repellent liquid and an ink affinity agent. As a result, compared with traditionally synthesized waterproof papers requiring special processing and treatment and thus incurring an increased cost or compared with plastic products, the material of the printed product is cheaper.

The printed product is durable, conforms to the concept of environmental protection, and can be widely used in outdoor sports, industrial and commercial operations, toys in the bathing, cooking recipes, hygiene management services, etc.

The printed product has competitive characteristics and performance. For example, it can resist extreme temperatures, abnormal environments, and is suitable for industrial applications or the structure of the product will not be damaged by destructive forces encountered during special works.

BRIEF DESCRIPTION OF THE DRAWINGS

In order to describe the technical solutions of the embodiments of the present disclosure more clearly, the following will briefly introduce the drawings that need to be used in the embodiments. It should be understood that the following drawings only show certain embodiments of the present disclosure, and therefore should not be considered as limitations to the scope of the present disclosure. For those of ordinary skill in the art, other related drawings can be obtained from these drawings without any creative work.

DETAILED DESCRIPTION OF THE EMBODIMENTS

Figure 1:
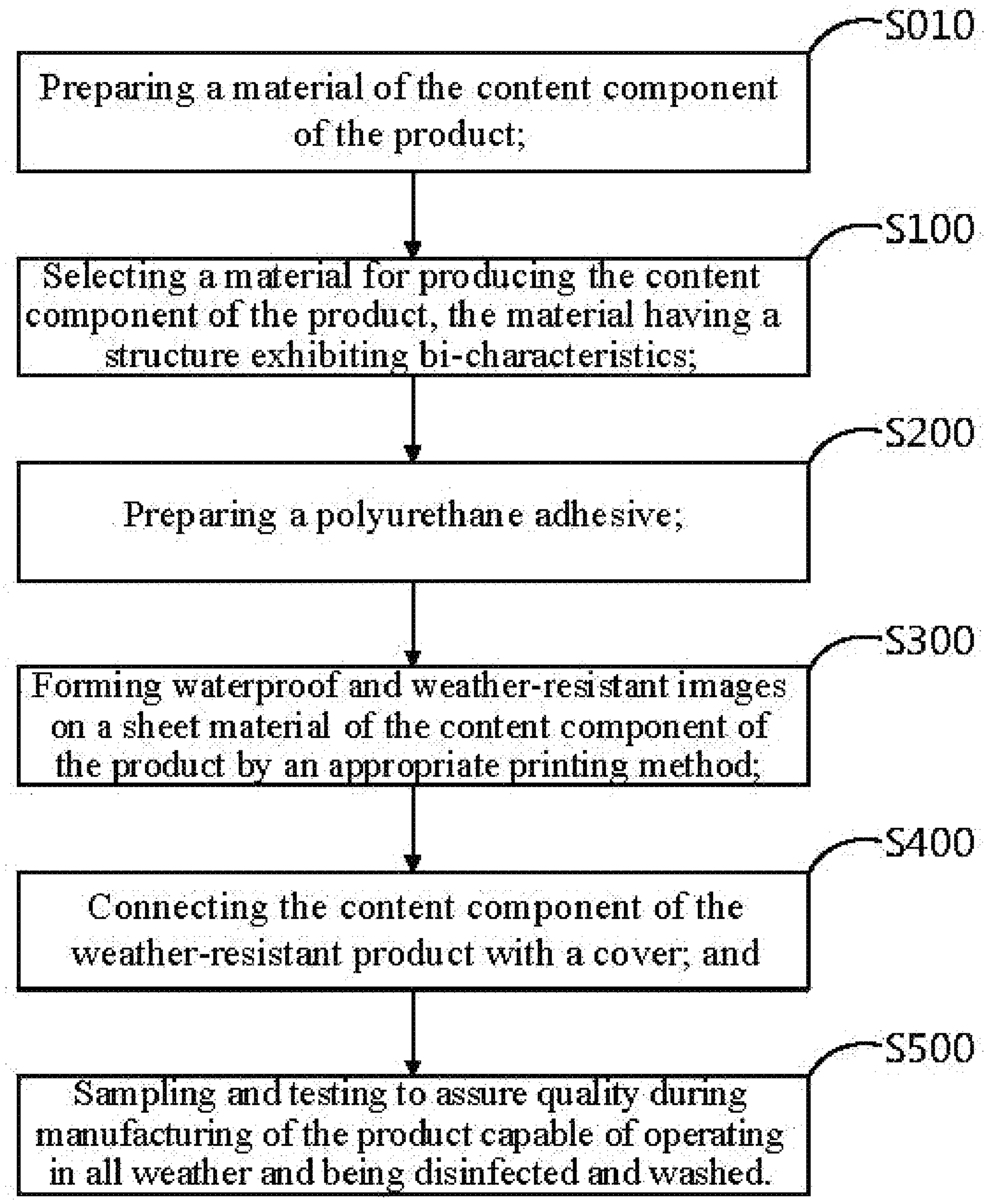
FIG. 1 shows a schematic flowchart of a manufacturing and quality testing method for a printed product according to some embodiments of the present disclosure.

In order to make the objectives, technical solutions, and advantages of the embodiments of the present disclosure clearer, the technical solutions in the embodiments of the present disclosure will be described clearly and completely below in conjunction with the accompanying drawings in the embodiments of the present disclosure. It is obvious that the embodiments described are only some of the embodiments of the present disclosure, but not all the embodiments. Therefore, the following detailed description of the embodiments of the present disclosure provided in the accompanying drawings is not intended to limit the scope of the claimed present disclosure, but merely a description of selected embodiments of the present disclosure. All other embodiments obtained by those of ordinary skill in the art based on the embodiments in the present disclosure without any creative work fall within the protection scope of the present disclosure. It should be noted that the features in the embodiments of the present disclosure can be combined with one another if there is no conflict.

The present disclosure is an innovative all-weather product that is capable of resisting extreme temperatures and abnormal environments, meeting the requirements for being recycled and reused, and effectively extending the life cycle of products, and has a great value in environmental protection. Therefore, compared with traditional waterproof books, the present disclosure has wider application, a competitive advantage, and a good development potential.

The present disclosure can provide a new thought on the publishing industry and provide new opportunities for traditional paper publications. For example, there is a commercial demand for special-purpose reading materials that are suitable for use in extreme conditions. On the other hand, disinfection and washing under such extreme conditions are required by hygiene management services. The present disclosure sets up new standards for producing products that operate in all weather, with respect to special construction of materials (the materials used for printing can achieve waterproof and printing effects without being specifically processed and treatment), an irreversible cured adhesive, as well as specific preparatory work before a binding process. Finally, quality test standards are provided to prove the inventiveness of the method of the present disclosure. The practicability of this technology can solve the current problem of lack of durability of paper products.

Marketability is concerned with whether a promoted product has a competitive position in the market. In other words, marketability is to analyze the relationship between the potential of a product being able to be sold and the risk of the product not being able to be sold. The following is an analysis of the marketability of the technology and product of the present disclosure.

Cost and Price:

The material of this product is a waterproof sheet material made from a strong, rigid and durable adhesive which is formed from specifically formulated paper-like fiber filaments and lignin having highly stable chemical bonds. During the process of producing sheet materials, micro-pores are formed by pressing on the surface, and the micro-pores can provide capillary action which makes the material hydrophilic, and thus there is no need to apply a water-repellent liquid and an ink affinity agent. As a result, compared with traditionally synthesized waterproof papers requiring special processing and treatment and thus incurring an increased cost or compared with plastic products, the material of the printed product is cheaper. In the printing process, a printer that can print paper at a high speed is used, which can also reduce the production cost.

Customer's Demands:

The product of the present disclosure is durable, conforms to the concept of environmental protection, and can be widely used in outdoor sports, industrial and commercial operations, toys in bathing, cooking recipes, hygiene management services, etc. Publishers can issue diversified products to meet demands, and customers will be motivated to purchase the products.

Functions and Performance:

This product has competitive characteristics and performance. For example, it can resist extreme temperatures, abnormal environments, and is suitable for industrial applications or the structure of the product will not be damaged by destructive forces encountered during special works. There are no technical solutions and products having the same nature in today's publishing industry.

How to Manufacture:

The manufacturing of the all-weather product requires the use of a special bi-characteristic carrier material, a permanent color pigment liquid or ink, an adhesive that cannot reverse a chemical change, and a binding method that provides durability to resist extreme temperatures and abnormal environments. The permanent color pigment liquid or ink is used. That is, the color pigment liquid or ink can be locked in a waterproof fiber filament tissue at least for a very long time.

The material used for manufacturing the product should have the following characteristics.

1. The material must be made from strong, rigid, and waterproof fiber filaments, and is hydrophilic to absorb a printing ink.
2. The printing ink must be permeable, and meet physical operating requirements of a capillary so as to be able to penetrate between the waterproof filaments and tissue in the material and then fuse and solidify and then be permanently locked in the waterproof filament tissue.
3. The adhesive must not reverse its chemical change after being cured otherwise physical disintegration can be caused. Among a series of curing agents, a curing agent with the highest chemical bond should be the first choice.
4. A durable mechanical tying system is used, or the mechanical tying system is used in combination with the adhesive mentioned in the above item 3.

The final product can resist the above-mentioned abnormal temperatures and environments without damaging the structure of the material, the adhesive, binding components and without causing discoloration of images, and thus will not cause any structural damage.

The product described in the present disclosure has an all-weather resistance function and is suitable for operating under various extreme temperatures and abnormal environmental conditions, and thus can meet the requirements for use in all weather and disinfection and washing. The selected material can be used for printing, and can achieve waterproof and printable effects without being particularly treated. Specifically, the following areas are involved.

i) Rigidity is provided by a waterproof fibrous tissue with a high stiffness which is formed by mixing and combining waterproof fiber filaments with an adhesive containing lignin. The lignin is a cross-linked phenol polymer and is thus combined with the fiber filaments to form a rigid structure.

ii) Hydrophilicity is provided by liquid-permeable micro-pores which need to be formed on the surface of the material when the material is produced.

iii) Capillary action is the physical activity of a liquid inside a tube. Due to the difference of cohesion and adhesion in the tube, the liquid rises in the opposite direction against the force of gravity.

The product, due to its resistance to high temperature, can be used as a short-term recording tool in which case data recorded can be removed easily by means of heat. This method is to use an ink that vaporizes when encountering suitable heat as a writing tool, and when removing the record, the printed product is placed in a high temperature environment which may be boiling water, or the ink can even be vaporized by means of a hot iron or by being heated in a microwave oven to remove the writing record, which facilitates the reuse of the printed product in all weather.

In some embodiments of the present disclosure, the manufacturing of the printed product provided by the embodiments of the present disclosure includes the following steps.

1) Specifications for materials:

i) The material of contents of the product must have a strong and rigid structure that is weather-resistant. A waterproof fibrous tissue with a high stiffness and a lignin-containing adhesive are combined to form a sheet material. A blasting force of the sheet material can be ten percent greater than that of a sheet material having a same thickness made from a traditional pulp. At the same time, the sheet material has hydrophilic micro-pores on its surface.

ii) The printing ink used is a fluid of pigment particles containing micron pigment particles suspended in an aqueous or non-aqueous solution, or a fluid of dye containing the dye mixed in an aqueous or non-aqueous solution. The printing ink should be characterized by high fluid viscosity and high permeability. The viscosity of the fluid is required to comply with the physical phenomenon of capillary action.

iii) An irreversible adhesive with high chemical bonds is used. The curing process can only be a unidirectional chemical reaction, and chains of the bonds cannot reverse the chemical change to cause physical melting or dissolution or adhesion. When the curing process is completed, the cured body has a strong physical bond which cannot be damaged or broken at extreme temperatures. The cured body should be flexible in terms of its physical state and is greatly flexional. The expansion force can reach a normal stress of 9 MPa, and the maximum elongation rate is 700%. Waterproof glass fiber filaments may also be added to the adhesive with the chemical bond to increase the adhesive ability and flexibility.

2) Printing process:

Waterproof and weather-resistant images are produced on the sheet material with a single-side or double-side printing process through an appropriate printing method. In the printing process, the ink is directly sprayed or thermally transferred to the micro-pores on the surface of the sheet material, and is drawn into the waterproof fiber tissue or waterproof fiber filaments under the capillary action. The ink is then dried and solidified, by way of which the pigment or dye is permanently locked between the filaments and enters a permanent solidified state, and does not melt when subjected to heat. The weather resistance property of the ink is thus realized. Another thermally transferring method for an image is to cover the sheet material with a carrier carrying the image formed by pigments, and then use this printing process to apply to all sheet material components in the product.

3) Preparation project for weather resistance:

Before connecting the product component, a position to which the cover is to be connected is pre-determined on an printed inner page sheet material, and slot-shaped openings or boundary holes are cut at the position with a rough cutter, or the inner page sheet material is folded into separate inner page groups, or the inner page sheet material is cut into separate sheets for application of a tying project, and then an adhesive with chemical bonds is applied along a construct position of the tying project so as to assembly the product. Another type of tying project involves punching, drilling or sewing on edges of separate sheets formed by cutting the material, for installing a mechanical tying device.

4) Manufacturing the product:

The cover and the content component may be connected to each other through the following ways:

i) an irreversible adhesive with high chemical bonds;

ii) sewing;

iii) a mechanically tying assembly; and iv) a combination of two or three of the above.

5) During the process of manufacturing the product capable of operating in all weather and capable of being disinfected and washed, sampling and testing are performed to assure quality, and then it is analyzed whether the test results meet the standards. The items to be tested and qualification standards thereof are as follows:

i) decomposition test of the material;

ii) adhesion test of the ink;

iii) physical bond test of the adhesive; and iv) test of the tying device system.

The research background of the present disclosure is that standards of all-weather resistance, disinfection and washing treatment must be met. The detailed discussion is as follows.

1) The all-weather resistance should be able to resist an extreme temperature from sub-zero to fluid vaporization, a turbulent fluid generated in a pool of tumbling, or a friction generated by a mass of static or tumbling air that makes the materials impact each other in an abnormal environment. Such extreme temperatures and abnormal environmental conditions can result in destructive forces in the state of stretching, shearing, compressing, peeling, tearing, bursting, puncturing, etc., or result in the destructive forces of a combination of the above at the same time, leading to premature aging of the material, fading of images, damage to the adhesion force of the adhesive, and damage to the structure of the tying device system. All the above-mentioned destructive forces can cause structural damage to the printed product, breaking the adhesion or tearing the waterproof fiber filaments. The extreme temperatures and abnormal environments are as follows.

i) Sub-zero temperatures: Freezing temperature can solidify the liquid or moisture stored in the waterproof fiber filaments of the material and increase the total volume.

ii) A condition in which a fluid evaporates into steam or gasifies: The temperature of the fluid in an evaporation state will weaken the structure of the product or dissolve or disassembly the same and shorten the life cycle.

iii) A fluid rolling environment: In fluid state of different degrees of rolling, the flow rate can cause the product to roll, and a physical friction produced in the process results in the above-mentioned various destructive forces.

iv) An air moving environment: Under different flow rates of a rolling gas, the flow rate can cause the product to roll, and a physical friction produced in the process results in the above-mentioned various destructive forces.

2) Physical methods, chemical methods and electric wave methods are three common methods of disinfection and washing, and the disinfection and washing are performed within a specific duration of time at a certain extreme temperature and an abnormal environment selected according to requirements of a method selected among the different methods.

i) Physical methods: Disinfection and washing are operated in static or dynamic modes, which involve operation of the physical frictions generated by the extreme temperatures, tumbling fluid or air turbulence. The following challenges are encountered during the operation.

Static mode: Extreme temperatures are adopted to operate. The temperature can be from freezing sub-zero environments to hot air or steam with extremely high temperatures. It can also operate by immersing into a fluid with an extreme temperature. The applied temperature can operate recurrently.

Dynamic mode: Physical frictions generated by the random tumbling movement are adopted to operate. The rolling movement can be the physical frictions generated by tumbling fluid or air turbulence. The fluid or air turbulence can operate in combination with extreme temperatures as needed.

ii) Chemical method: The product is immersed into a required liquid pool containing at least one of formaldehyde, ozone, plasma, etc. The operating time is set according to different characteristics of chemical matters, and under turbulent environments with different temperatures, an optimum effect is achieved by a static or rolling and frictional action.

iii) Electromagnetic waves: Microwave radiation energy can induce atomic vibrations, and this energy can be absorbed by a variety of substances. The fluid may be one of the substances that respond to this energy, and the heat diffused during the vibration is sufficient to evaporate water, which is a typical disinfection method.

3) Material and binding and tying device

The materials used for manufacturing this all-weather resistant printed product and the binding and tying devices can operate in all-weather under extreme temperatures and abnormal environmental conditions or undergo disinfection and washing without being damaged. The product is intended to resist the following:

Destroying the physical structure of the material;

i) Fading of images caused by shedding of printed ink;

ii) Destroying the adhesion force of the irreversible cured adhesive; and iii) Damage to the structure of the tying device.

4) The sheet material is constructed by bonding or weaving waterproof fiber filaments.

The material is made by bonding waterproof fiber filaments with an adhesive having lignin or by weaving waterproof fiber filaments. The finished material has a thickness of from 0.01 mm to 3 mm. The material should have micro-pores on its surface, so that the printing ink can penetrate between the waterproof fiber filaments of the material and fuses, solidifies, and permanently adhere to the waterproof fiber filaments. It is manufactured through the following ways.

Multi-layer waterproof fiber filaments and an adhesive containing weather-resistant lignin are bonded together by using a traditional paper machine, and then dried and cured, and finally pressed by a high-pressure roller to form a smooth surface with micro-pores so as to meet physical requirements of capillary action.

The weather-resistant waterproof fiber filaments are criss-crossed into a sheet material with a weaving machine. The vertical and horizontal density of the material can be as small as a micron distance, which meets the physical requirements of capillary action.

5) During the process of manufacturing the product capable of operating in all weather and capable of being disinfected and washed, sampling and testing are performed to assure quality and then it is analyzed whether the test results meet the standards. Items to be tested are as follows:

i) decomposition test of material ii) adhesion test of the ink;

iii) physical bond test of the adhesive; and iv) test of the tying device system.

In some embodiments of the present disclosure, a manufacturing method for a printed product provided by the embodiments of the present disclosure includes the following steps.

1) A process of selecting materials involving various components of the product, which are sheet materials, a printing ink, an adhesive and a binding and tying system.

i) The material of the content component of the product is weather-resistant in structure, and is a sheet material produced by combining waterproof fiber filaments with a lignin adhesive. The fiber filaments can be specially-made natural fibers such as cotton or wool, which is then mixed with an appropriate amount of rubber, polyvinyl chloride (PVC), polyurethane (PU), silicone elastomer, fluoropolymer, wax and other waterproof materials together to form a sheet material with a thickness of from 0.01 mm to 3 mm. Or some of the above waterproof materials are selected. The selected waterproof fiber filament is hydrophilic, which can be permanently fused with the printing ink.

ii) The component of a printing ink is micron pigment particles suspended in an aqueous or non-aqueous solution, or a fluid of pigment particles containing micron pigment particles suspended in an aqueous or non-aqueous solution, or a fluid of dye containing the dye mixed in an aqueous or non-aqueous solution. The printing ink should be characterized in that it has high fluid viscosity and high permeability. The fluid viscosity is required to comply with the operation of the physical phenomenon of capillary action.

iii) The irreversibly cured adhesive is used to bond the material of the content components into a product. Isocyanate and water vapor undergo chemical changes. Irreversible bonding means that the curing process can only be a unidirectional chemical reaction. When the curing process is completed, the cured body has a strong physical bond which cannot be damaged or broken when subjected to extreme temperatures. The chains of the bonds cannot reverse the chemical change to cause physical melting or dissolution or adhesion, resulting in disintegration of materials of the content component of the products. The cured body should be flexible in terms of its physical state and is greatly flexed during reading.

Formula of the adhesive: polyurethane as irreversible adhesive=(moisture in the air+isocyanate+$CO_2$)+isocyanate.

The expansion force reaches a normal stress of about 9 MPa.

The maximum stretch rate is up to 700%.

In order to reinforce the strength and flexibility of the irreversible adhesive, glass waterproof fiber filaments with a maximum length of 15 mm can be optionally mixed into the adhesive, with a largest volume ratio of the waterproof glass fiber filaments to the adhesive being 50%, to increase the adhesive ability and flexibility.

2) Printing: The ink is transferred to all components in the product by appropriate printing methods. The ink must have a high fluid viscosity and a high permeability to meet the physical operation of capillary action. The process is specifically as follows. The ink is drawn through the micro-pores into the waterproof fiber tissue; the pigment particles or dyes in the ink are locked between the fiber filaments and tissue under capillary action, and are permanently fused together; or the ink can be at room temperature or pre-heated, the pigment particles or the dyes are introduced to the micro-pores on the surface of the material in the sublimation manner, and then cooled down, and the pigment particles or dyes and the fibrous structure are permanently fused into a solid state under the physical characteristics of capillary action. The selected ink can be in a type of pigments, a size of which can be less than 20 microns, or can be a fluid of dye. The method for drying the ink can be naturally drying, oxidation, volatilization, ultraviolet curing, thermal sublimation, and baking.

3) For the binding process, which is all-weather resistant, a special rough cutting method for cutting a slot-shaped opening or a sewing method as well as an irreversible adhesive should be adopted; or a binding method with a mechanically tying device is adopted.

i) Applying an irreversible adhesive to the part with special slots or boundary holes: The irreversible adhesive is used to bond the cover and the inner page groups together. The curing process of the adhesive is a unidirectional chemical reaction and chains of the bonds cannot be reversed. Stable adhesion strength is provided when the process is completed. Optionally, in order to particularly reinforce the adhesion, glass waterproof fiber filaments can also be added into the adhesive. The product made of the cured body can resist extreme temperatures and abnormal environments, and its physical state can no longer be melted or dissolved to prevent disintegration of the product material. During the binding process, the content component is folded to increase the contact area for receiving the adhesive, providing the maximum adhesion force. The folded edge of the content component of the book should be roughly cut to form slot-shaped openings or boundary holes, which have a length of from 2 mm to 50 mm and are spaced at a distance of from 2 mm to 50 mm. The width of the cutting openings is at least 0.1 mm. Loose waterproof fiber filaments with different lengths are randomly exposed at the edges of the slots or boundary holes. In this way, the fiber filaments with a loose length can provide a structural anchoring force to the cured body of the adhesive, thereby enhancing the durability of the product. Finally, the edge without the adhesive is neatly cut to obtain a readable publication.

ii) Sewing the inner pages and applying the irreversible adhesive thereto: In the binding process, as the above-mentioned bonding method, the inner pages are folded, multiple groups of inner pages are arranged in sequence, and the folded inner pages are sewn with a waterproof thread so that all the inner pages are connected to obtain an integrated inner page group. The inner page group and the cover are combined with each other with a durable and weather-resistant irreversible adhesive. Finally, the edge without the adhesive is neatly cut to obtain a readable publication.

iii) Sewing without an adhesive: In the binding process, the inner pages and the cover are overlapped and arranged in the reading order. By way of sewing a waterproof thread is passed through the inner pages and the cover that are overlapped using a needle so that the inner pages and the cover are combined into one piece according to a specific threading rule of sewing. A knot is tied at the end of the threading rule to prevent the disintegration of a publication when the threading is completed. Finally, the edge without the thread is neatly cut to obtain a readable publication.

iv) Mechanically binding: The tying device system can be a wire comb made of metal or plastic; a spiral comb; a fastening tape; an adhesive tape; Velcro; a button; a zipper; or a rope. The tying system as a whole will not disintegrate when encountering extreme environments. In the binding process, the inner pages are cut into separate sheets; the cover and the inner pages are arranged in sequence, and then punched or drilled along the position where the tying system is to be arranged; the tying system is installed at this position to finish the product. This tying system can be permanently locked, or unlockable, and in the latter case it is easy for a reader to remove, add or adjust the inner pages so as to change the reading sequence according to the needs of the reader.

4) The content component of the product is made according to the type of printed product and there are the following options. Whatever the product is, it is always necessary to use a waterproof fiber material, form slot-shaped openings or boundary holes by using a rough cutter, and use an adhesive with irreversible chemical bonds, or a tying system to integrate all components. The following are the types of products that can be produced.

i) Leaflets, posters, envelopes and boxes. The product material is composed of at least one or more of the above-mentioned special sheet materials, and then produced using a conventional printing industrial producing device.

ii) Multi-page books. The inner pages consist of multiple groups of separate two-page sheets in the editing order; or the inner pages can also be an inner page group consists of a collection of multiple folding groups in a reading sequence with each folding group being 4, 8, 12, 24, 32 pages. And then the cover and inner page group are combined together by using a conventional printing industry producing device.

5) During the process of manufacturing the product capable of operating in all weather and capable of being disinfected and washed, sampling and testing are performed to assure quality. The testing method is as follows.

In order to ensure quality of the product, according to applications of the product, the test is performed at an expected temperature and in an environment under which the product is used. A test instrument is used to simulate destructive results such as stretching, shearing, compressing, peeling, tearing, bursting, and puncturing caused by rolling and rubbing produced under extreme temperatures and various abnormal environmental conditions. The instrument is a refrigerator providing a sub-zero temperature, a hot air heater, a steam vortex furnace, and a liquid boiling pot. Procedures of the tests and the qualification standards are as follows.

1) A temperature, an abnormal environment, and a test duration that are expected for the simulation operation are set according to the application of the product.

2) A suitable test instrument is selected to simulate the destructive rolling and friction produced under an extreme temperature and various abnormal environmental conditions.

3) A material to be tested with an appropriate size is prepared depending on the size of the simulation device. Or, the whole product is tested.

4) The temperature, the abnormal environment, and the test duration required by the test instruments are adjusted and then testing is performed.

5) Finally, it is analyzed whether testing results meet the standards. The items tested and their qualification standards are as follows.

i) Decomposition test of the material: The edge position of the material is checked visually with a magnifying glass. The fiber filaments should not be exposed or fall off, and the material should not be structurally broken or decomposed.

ii) Adhesion test of the ink: A color block used to monitor the amount of the ink used in the printing process is the measurement tool and measurement target of the test. If it is determined by a comparison that a difference between density readings on the color block before and after the test is not less than +/−0.05, it means that the ink is not washed off and the image does not fade.

iii) Physical bond test of the adhesive; It is visually checked whether the structure of the cured body of the irreversibly chemically changed adhesive is melt or disintegrated to cause the cover of the product and the one-piece separate inner page components to separate from each other.

iv) Test of the tying device system: It is visually checked whether structures of mechanical components are separated from each other, melted, or disintegrated.

According to the present disclosure, said innovative technology and manufacturing method is used to manufacture a printed product capable of resisting abnormal environmental changes, operating in all weather, and providing hygiene management business operations. The product has the following characteristics.

1) The material of the content component of the product has a structure that exhibits bi-characteristics which are rigidity and hydrophilicity.

i) Rigidity is provided by a waterproof fibrous tissue with a high stiffness which is formed by mixing and combining waterproof fiber filaments with an adhesive containing lignin. The lignin is a cross-linked phenol polymer and is thus combined with the fiber filaments to form a rigid structure.

ii) Hydrophilicity is provided by liquid-permeable micropores which need to be formed on the surface of the material when the material is produced.

2) Due to physical phenomenon of capillary action, the ink is drawn through the micro-pores on the sheet material into a waterproof fiber tissue or gaps between waterproof fiber filaments. Then the ink is dried, rendering the pigment particles or dye solidified and permanently locked between the fiber filaments or yarns.

Referring to FIG. 1, some embodiments of the present disclosure provide a manufacturing and quality testing method for a printed product capable of resisting abnormal environmental changes and operating in all weather and suitable for hygiene management operations. The method includes the following steps.

In Step S100, a material for producing a content component of the product is selected. The material has a structure that exhibits bi-characteristics which are rigidity and hydrophilicity.

i) Rigidity is provided by a waterproof fibrous tissue with a high stiffness which is formed by mixing and combining waterproof fiber filaments with an adhesive containing lignin. The lignin is a cross-linked phenol polymer and is thus combined with the fiber filaments to form a rigid structure.

ii) Hydrophilicity is provided by liquid-permeable micropores which need to be formed on the surface of the material when the material is produced.

In Step S200, a polyurethane adhesive is prepared. The polyurethane adhesive is characterized in that during the chemically curing process of the adhesive, isocyanate and water vapor undergo chemical changes, unidirectionally transform into strong physical bonds, and then become cured to obtain a cured body. Chains of the bonds are characterized in that they are not to be damaged or broken when subjected to extreme temperatures, and thus are capable of resisting abnormal environmental changes, without their chemical changes being reversed which can cause physical disintegration of the chains of the bonds and thus damage the structure of the printed product. The cured body should be flexible in terms of its physical state and be greatly flexional when used. In order to reinforce the strength of the irreversible adhesive, waterproof glass fiber filaments with a maximum length of 15 mm may be mixed into the adhesive with a largest volume ratio of the waterproof glass fiber filaments to the adhesive being 50% to increase the adhesive ability and flexibility.

In Step S300, waterproof and weather-resistant images are formed on a sheet material of the content component of the product by an appropriate single-side or double-side printing method. An ink used is a fluid of pigment particles containing micron pigment particles suspended in an aqueous or non-aqueous solution, or a fluid of dye containing the dye mixed in an aqueous or non-aqueous solution. The viscosity of the fluid is required to comply with the physical phenomenon of capillary action. During the printing process, the ink passes through the micro-pores on the sheet material and is drawn into a waterproof fiber tissue or gaps between the waterproof fiber filaments by the physical phenomenon of the capillary action, and then the ink is dried or cooled down, rendering the pigment particles or the dye solidified and permanently locked between the fiber filaments or yarns. The pigment particles or the dye does not melt when subjected to heat and its adhesion is thus achieved. This printing process can be used to print all components of the product.

In Step S400, connecting between the content component of the weather-resistant product and a cover is performed. The connecting may be realized by means of a polyurethane adhesive, sewing, mechanical assembly, or a combination of two or three of the following processes.

i) A binding process in which a polyurethane adhesive is used is as follows. 1) A position to which the cover is to be connected is determined on printed inner page sheet materials, and slot-shaped openings or boundary holes are cut at the position with a rough cutter, until waterproof fiber filaments at a rough end of the rough cutter are exposed and become loose, by way of which stability and adhesion of a combination with the adhesive is enhanced. 2) The inner page sheet materials are folded into separate inner page groups. 3) The separate inner page groups are arranged according to a reading sequence to form the content component of the product. 4) The exposed loose waterproof fiber filaments of the sequentially arranged separate inner page groups are combined with the cover by means of the polyurethane adhesive. 5) Then an edge without the adhesive is cut to form a readable publication.

ii) A binding process in which sewing and an adhesive is used is as follows. 1) Printed inner page sheet materials are folded into separate inner page groups. 2) The separate inner page groups are arranged according to a reading sequence to form the component of the product. 3) All the separate inner page groups are connected into one piece by a sewing process implemented manually or mechanically. 4) The one-piece separate inner page groups and the cover are connected together with the polyurethane adhesive. 5) Then an edge without the adhesive is cut to form a readable publication.

iii) A binding process in which sewing is used and an adhesive is not used is as follows. 1) Printed inner page sheet materials are folded into separate inner page groups. 2) A waterproof thread is passed through the inner pages and the cover that are overlapped by using a needle to connect the inner pages and the cover into one piece according to a specific threading rule in sewing. 3) A knot is tied at the end of the threading rule when the passing of the thread is completed so as to prevent disintegration of the publication. 4) An edge without the threading rule is cut to form a readable publication.

iv) A binding process is which mechanically tying assembly is used is as follows. 1) Printed inner page sheet materials are cut into separate sheets. 2) The cover and needed separate sheets are arranged according to a reading sequence to form a content component. 3) A hole is formed by punching or drilling along a position where a tying system is to be arranged. 4) Finally, a tying device is installed at the position of the hole to obtain a readable publication. The tying system may be permanently locked or unlockable, and in the latter case inner pages can be removed, added, or adjusted to change the reading order according to needs of a reader.

In Step S500, during the process of manufacturing the product capable of operating in all weather and capable of being disinfected and washed, sampling and testing are performed to assure quality. Test items and qualification standards are as follows.

In order to ensure quality of the product, according to applications of the product, the test is carried out at an expected temperature and in an expected environment under which the product is used. A test instrument is used to simulate destructive effects of stretching, shearing, compressing, peeling, tearing, bursting, puncturing, etc. caused by rolling and rubbing produced under an extreme temperature and various abnormal environmental conditions. The instrument is a refrigerator providing a sub-zero temperature, a hot air heater, a steam vortex furnace, and a liquid boiling pot. Procedures of the tests and the qualification standards are as follows.

1) A temperature, an abnormal environment, and a test duration that are expected for the simulation operation are set according to the application of the product.
2) A suitable test instrument is selected to simulate the destructive rolling and friction produced under an extreme temperature and various abnormal environmental conditions.
3) A material to be tested with an appropriate size is prepared depending on the size of the simulation device. Or, the whole product is tested.
4) The temperature, the abnormal environment, and the test duration required by the test instruments are adjusted and then testing is performed.
5) Finally, it is analyzed whether testing results meet the standards. The items tested and their qualification standards are as follows.

i) Decomposition test of the material: The edge position of the material is checked visually with a magnifying glass. The fiber filaments should not be exposed or fall off, and the material should not be structurally broken or decomposed.
ii) Adhesion test of the ink: A color block used to monitor the amount of the ink used in the printing process is the measurement tool. The color block is measured and the result is compared with the industrial standard value to find out whether the standard is met. A reading difference in density less than +/−0.05 means that the ink is not washed off and the image does not fade.
iii) Physical bond test of the adhesive; It is visually checked whether the structure of the cured body of the irreversibly chemically changed adhesive is melt or disintegrated to cause the cover of the product and the one-piece separate inner page components to separate from each other.
iv) Test of the tying device system: It is visually checked whether structures of mechanical components are separated from each other, melted, or disintegrated.

Figure 2:
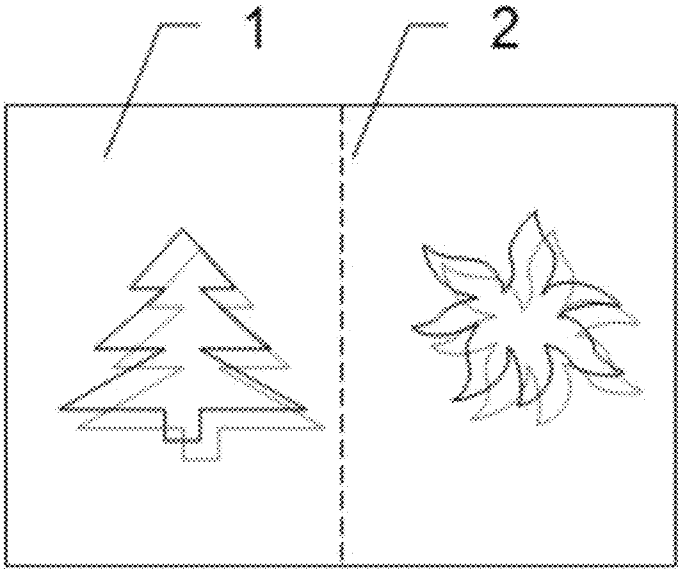
FIG. 2 shows a schematic diagram of a state in which a content component of the product is printed on one side or both sides thereof with an image and is then cut to form slot-shaped openings or boundary holes in step 400 of some embodiments of the present disclosure.

Referring to FIG. 2, in step S400, the material of the contents 1 of the product is printed with an image on one side or both sides thereof, and is then cut by a special cutting method to form slot-shaped openings or boundary holes 2.

Figure 3:
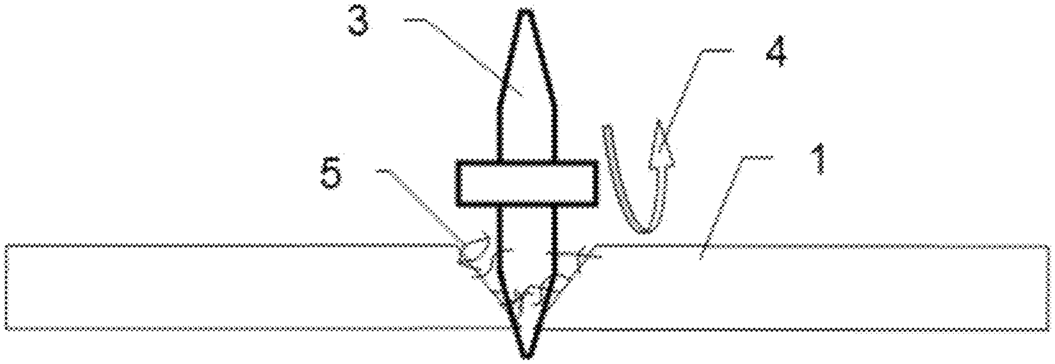
FIG. 3 shows a schematic diagram of a state in which waterproof fiber filaments of a material are exposed after slot-shaped openings or boundary holes are formed by cutting in step S400 of some embodiments of the present disclosure.

Referring to FIG. 3, in step S400, a rotatable cutting wheel 3 operates in a rotation direction 4 shown in this figure to obtain slot-shaped openings or boundary holes 2, and waterproof fiber filaments 5 of the material is exposed after the cutting process.

Figure 4:
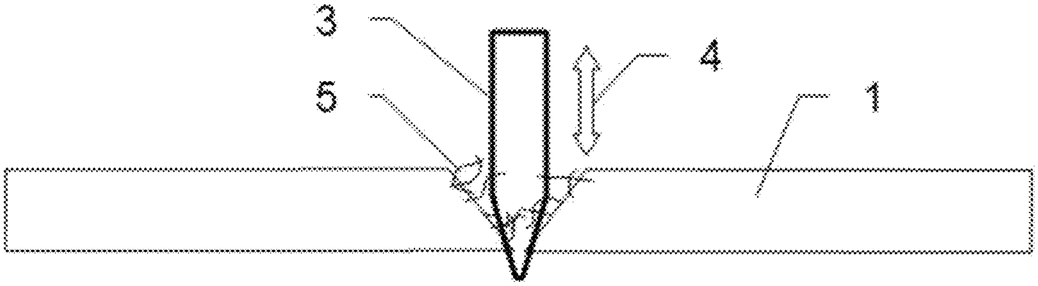
FIG. 4 shows a schematic diagram of a state after a rotatable cutting wheel cuts slot-shaped openings or boundary holes by up and down cutting actions in step S400 of some embodiments of the present disclosure.

Referring to FIG. 4, in step S400, the rotatable cutting wheel 3 as a hole-cutting tool operates following up-and-down cutting actions 4 to obtain the slot-shaped openings or boundary holes 2.

Figure 5:
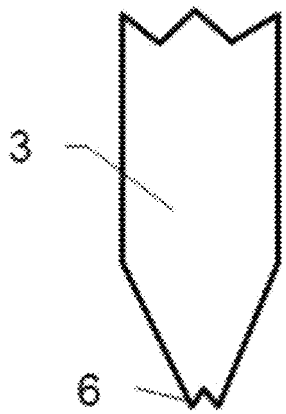
FIG. 5 shows a structural schematic diagram of a rough end of the rotatable cutting wheel according to some embodiments of the present disclosure.

Referring to FIG. 5, in step S400, a rough end 6 of the rotatable cutting wheel 3 as a specially designed cutting tool can tear the waterproof fiber filaments of the material.

Figure 6:
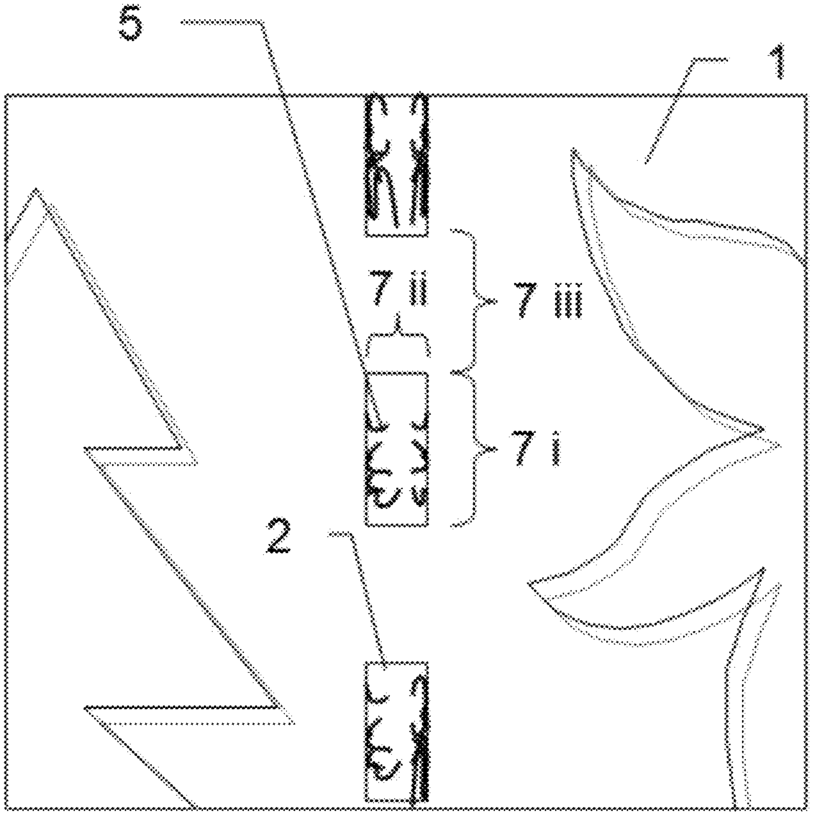
FIG. 6 shows a schematic diagram of a size of the slot-shaped openings or the boundary holes on the content component of the product according to some embodiments of the present disclosure.

Referring to FIG. 6, in step S400, the slot-shaped openings or boundary holes 2 on the material of the contents 1 of the product has a length 7*i* of from 2 mm to 50 mm, and a width 7*ii* of from 0.1 mm to 10 mm, and are spaced apart from each other by a distance 7*iii* of from 2 mm to 50 mm, so that the waterproof fiber filaments 5 are exposed.

Figure 7:
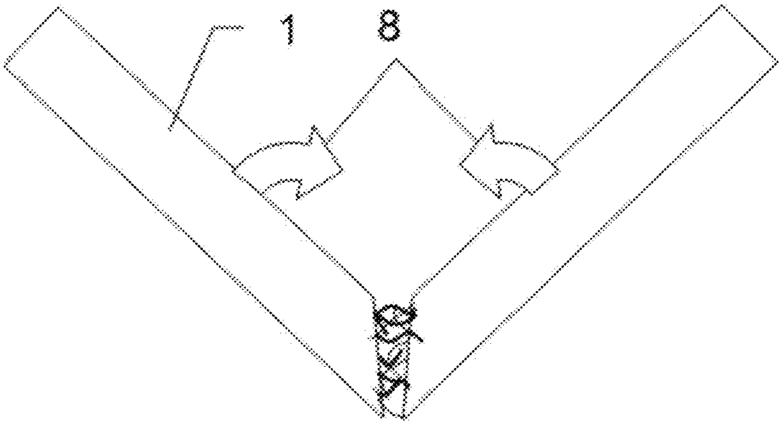
FIG. 7 shows a schematic diagram of a process of folding the content component of the product according to some embodiments of the present disclosure.

Referring to FIG. 7, in step S400, the folding of the material of the contents of the product 1 is carried out in a direction indicated by arrows 8.

Figure 8:
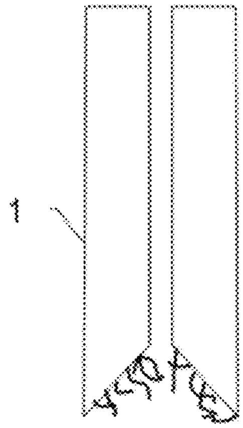
FIG. 8 shows a schematic diagram of the content component of the product in a folded state according to some embodiments of the present disclosure.

Referring to FIG. 8, in step S400, the folded inner page part, namely the contents 1 of the product is as shown in FIG. 8.

Figure 9:
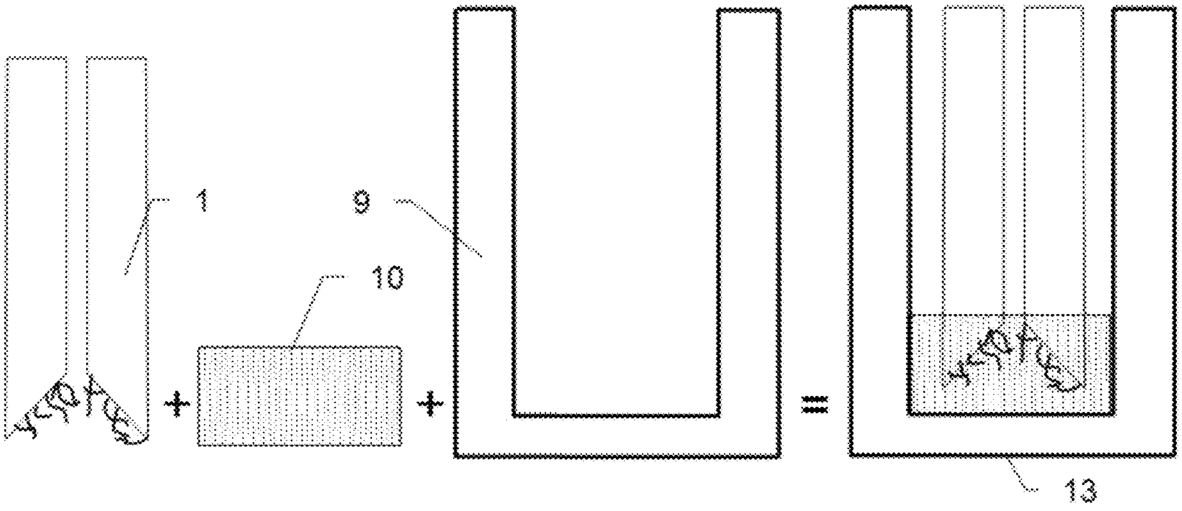
FIG. 9 shows a structural schematic diagram of a printed product formed by assembling the content component of the product and the cover into one piece by using an irreversible adhesive in step S400 of some embodiments of the present disclosure.

Referring to FIG. 9, in step S400 of some embodiments of the present disclosure, the printed product 13 is produced by a binding method in which the contents 1 of the product and the cover 9 are assembled into one piece by means of an irreversible adhesive 10 to obtain the printed product 13.

Figure 10:
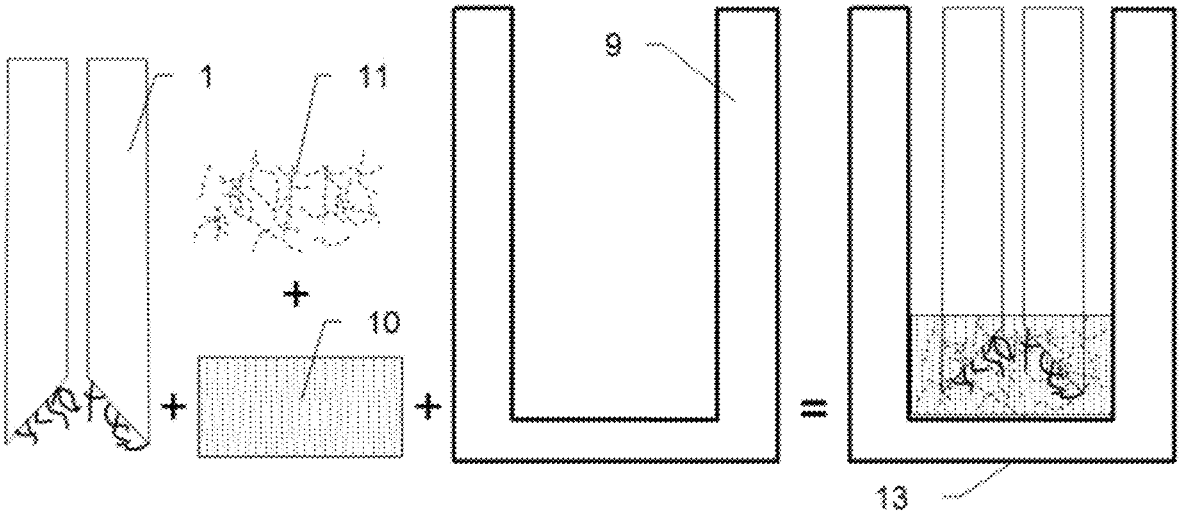
FIG. 10 shows a structural schematic diagram of a printed product formed by assembling the content component of the product and the cover into one piece by using an irreversible adhesive into which glass waterproof fiber filaments are added in step S400 of some embodiments of the present disclosure.

Referring to FIG. 10, in step S400 of some embodiments of the present disclosure, the printed product 13 is produced by a binding method in which the contents 1 of the product and the cover 9 are assembled into one piece by means of an irreversible adhesive 10 into which glass waterproof fiber filaments 11 are added to obtain the printed product 13.

Figure 11:
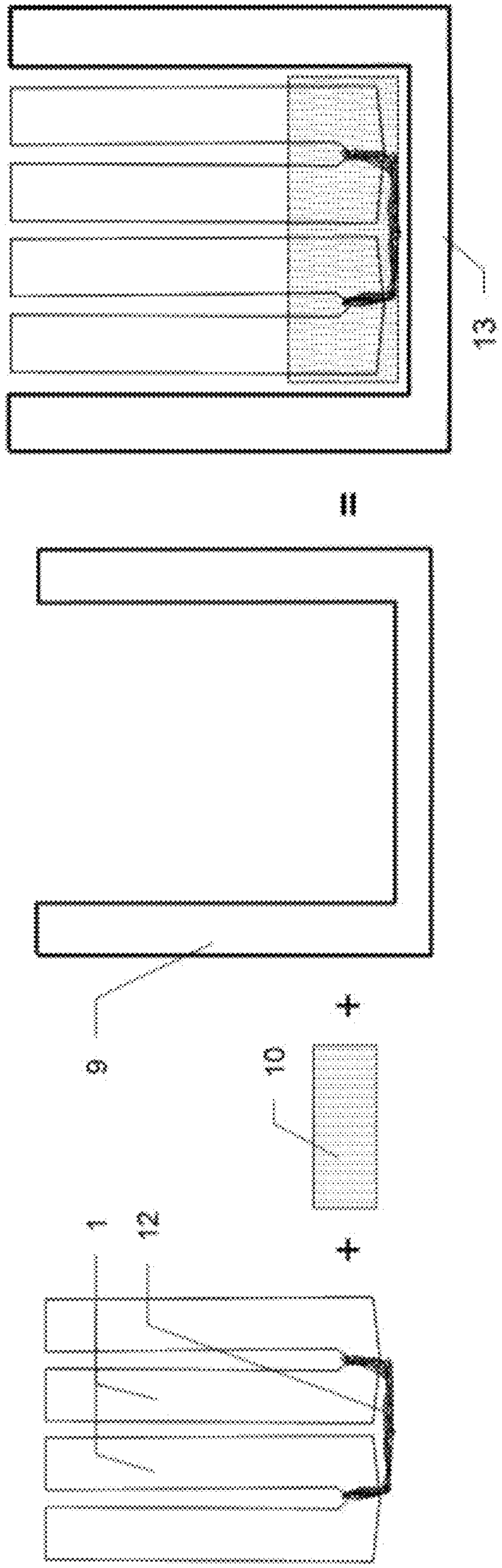
FIG. 11 shows a structural schematic diagram of a printed product formed by sewing the content component of the product to reinforce an inner page structure and then assembling the content component and the cover into one piece by using an irreversible adhesive in step S400 of some embodiments of the present disclosure.

Referring to FIG. 11, in step S400 of some embodiments of the present disclosure, the printed product 13 is produced by a binding method in which the contents of the product 1 is sewed with a thread 12 to reinforce an inner page structure, and then the content component of the product 1 and a cover 9 are assembled into one piece by using an irreversible adhesive to obtain the printed product 13.

Figure 12:
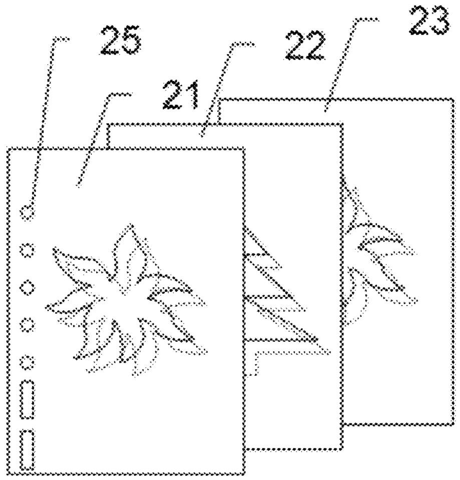
FIG. 12 shows a structural schematic diagram of sequentially arranged multiple individual sheet materials of the content component of the product with printed images and having slots and holes on an edge of a binding line in step S400 of some embodiments of the present disclosure.

Referring to FIG. 12, in step S400 of some embodiments of the present disclosure, multiple individual sheet materials of the content component of the product with printed images 21, 22, and 23 are sequentially arranged, and grooves and holes 25 are formed on an edge of a binding line.

Figure 13:
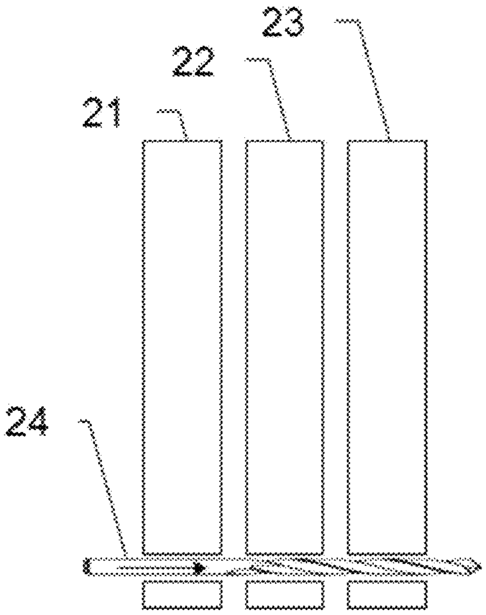
FIG. 13 shows a schematic diagram of drilling holes by a drilling tool used for forming binding holes in step S400 of some embodiments of the present disclosure.

Referring to FIG. 13, in step S400 of some embodiments of the present disclosure, a drilling tool 24 is used to form a binding hole for mounting a tying device.

Figure 14:
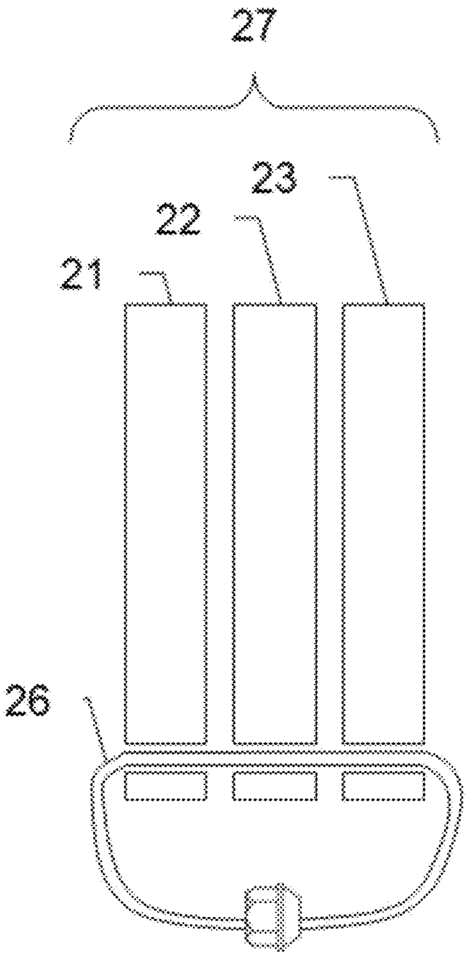
FIG. 14 shows a schematic diagram of producing a printed product from individual sheet materials using a tying device in step S400 of some embodiments of the present disclosure.
Figure 18:
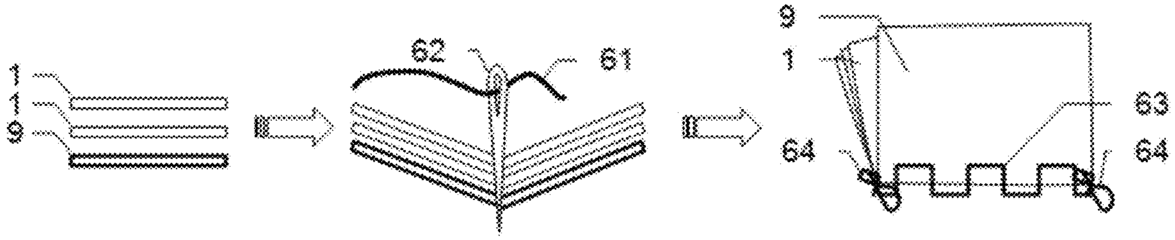
FIG. 18 shows a schematic diagram of a binding process in which sewing is used and an adhesive is not used in step S400 of some embodiments of the present disclosure.

Referring to FIG. 14, in step S400 of some embodiments of the present disclosure, the tying device 26 is used to produce a printed product 27 from the individual sheet materials of the inner pages 21, 22, and 23*s*. Referring to FIG. 18, in step S400 of some embodiments of the present disclosure, the contents of the product 1 and the cover 9 are overlapped and arranged according to a reading sequence, and a waterproof thread 61 is passed through the contents of the product 1 and the cover 9 that are overlapped by using a needle 62 to connect the contents and the cover into one piece according to a specific threading rule in sewing. A knot 64 is tied at end of the threading rule 63 when the passing of the thread is completed so as to prevent disintegration of the publication.

Figure 19:
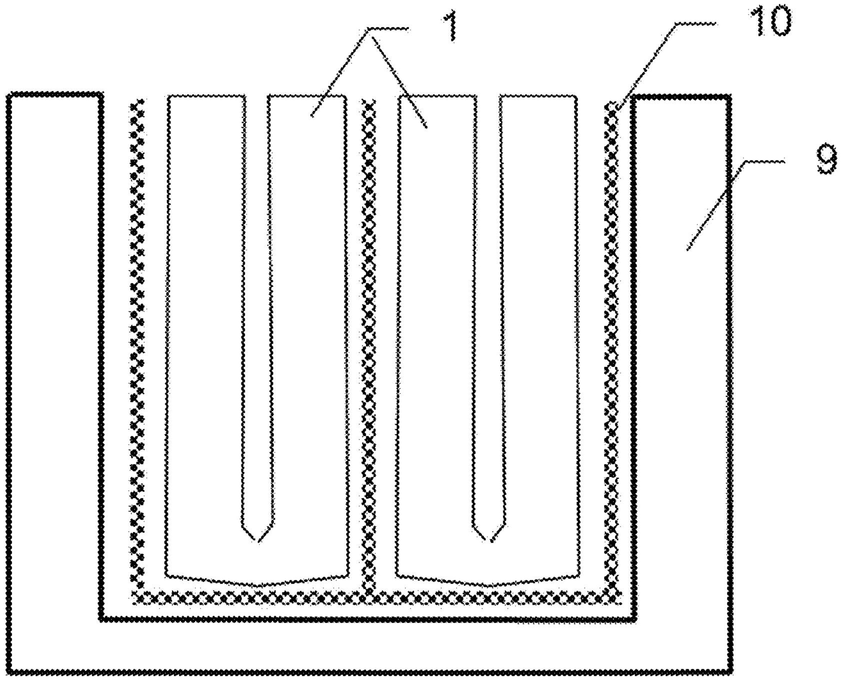
FIG. 19 shows a schematic diagram of a printed product produced by a simple production scheme of single-side printed inner pages according to some embodiments of the present disclosure.

Referring to FIG. 19, in some embodiments of the present disclosure, the provided method includes similar steps as described above, and the difference is that the solution of this embodiment is a simple production method, in which in step S300, the content component of the product is printed by a single-side printing method so as to form a waterproof and weather-resistant image on the sheet material of the contents 1 of the product, obtaining single-side printed inner pages; in step S400, the content component pages each are folded with a surface thereof with the image being folded inward and then arranged according to a reading sequence; the content component pages each are coated with an irreversible adhesive 10 on a surface thereof without the image so that all the inner pages are combined into one piece; and then the inner pages in one-piece is connected with the cover 9 coated with the irreversible adhesive 10. The production of the printed product is thus finished.

In addition, in some embodiments of the present disclosure, the printed product produced is a three-dimensional model. In addition to the above-mentioned similar steps, the provided manufacturing method further includes a step of producing the three-dimensional model of the printed product. The step of producing the three-dimensional model of the printed product includes: forming, at a determined folding position, a crease-line or slot-shaped openings or boundary holes with a rough cutter to obtain a model component; forming hook-shaped hooks on the model component for model components to connect with each other; folding the model component along the crease-line or the slot-shaped openings or boundary holes at the determined folding position; and pairing and fastening the hooks on each of the model components to make a three-dimensional model.

Figure 20:
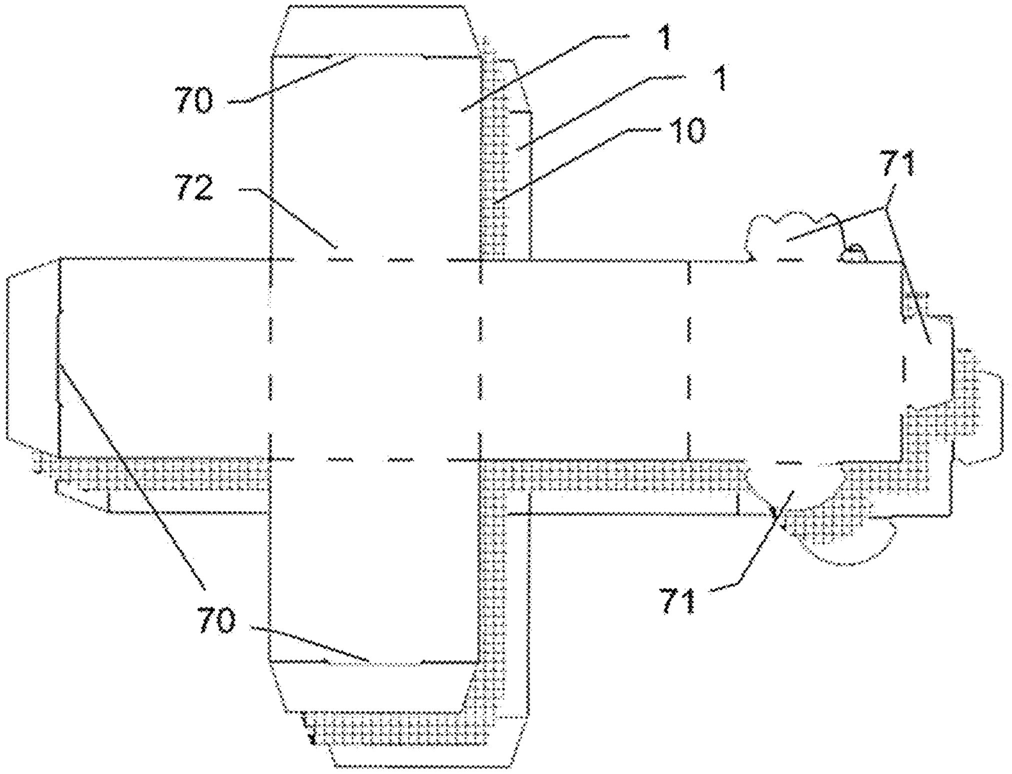
FIG. 20 shows a schematic diagram of producing a three-dimensional model in some embodiments of the present disclosure.

Referring to FIG. 20, in some embodiments of the present disclosure, the printed product produced is a three-dimensional model. In addition to the above-mentioned similar steps, the provided manufacturing method further includes a step of producing the three-dimensional model of the printed product. The step of producing the three-dimensional model includes: an appropriate printing process in which a permanent color pigment liquid or ink is applied onto a bi-characteristic carrier material of contents 1 of the product; a cutting process in which an outline, a slot 70, a fastener 71, and a folding line 72 are forming by cutting; and an assembling process in which a material on a side of the three-dimensional model is folded along the folding line 72, so that the fastener 71 is inserted into the slot 70 to form the three-dimensional model. In order to enhance the rigidity of the model, a material for strengthening the material of the three-dimensional model is attached to the main material of the three-dimensional model by means of the irreversible adhesive 10 before the cutting process for the bi-characteristic carrier material. This strengthening material can be a same material as the main material or can be other materials.

During the process of manufacturing the product capable of operating in all weather and capable of being disinfected and washed, sampling and testing are performed to assure quality.

Physical methods, chemical methods and electric wave methods are three common methods of disinfection and washing, and the disinfection and washing are performed within a specific duration of time at a certain extreme temperature and an abnormal environment selected according to requirements of a method selected among the different methods 1) Physical methods: Disinfecting and washing in a fluid or air turbulent environment are performed in a static mode or c s rolling and physical actions of friction. The physical method includes the following.
   i. An item is put in a freezing sub-zero condition.
   ii. An item is put in a device providing hot air or steam with an extreme temperature.
   iii. An item is immersed into a liquid pool with a set temperature. The temperature can be a temperature varying from freezing to boiling.
   iv. An item is placed in a device with a set temperature. The device can roll and move randomly, and the set temperature is also a temperature of from freezing to boiling.
2) Chemical methods: A product is immersed into a required liquid pool containing at least one of formaldehyde, ozone, plasma, etc. The operating time is set according to different chemical reaction speeds, and under turbulent environments with different temperatures, an optimum effect is achieved by way of a static or rolling and friction actions.
3) Electromagnetic wave methods: Microwave radiation can induce atomic vibrations, and this energy can be absorbed by a variety of substances. The fluid may be one of the substances that respond to this energy, and the heat diffused during the vibration is sufficient to evaporate water, which is a typical disinfection method.

During the process of manufacturing the product capable of operating in all weather and capable of being disinfected and washed, sampling and testing are performed to assure quality.

The all-weather resistance should be able to resist an extreme temperature from sub-zero to fluid vaporization, and abnormal environments, such as a pool of fluid or a mass of air in a static state, or a friction generated by a tumbling turbulent fluid, or a friction generated by a mass of rolling and tumbling air. Such extreme temperatures and abnormal environmental conditions can result in forces in the state of stretching, shearing, compressing, peeling, tearing, bursting, puncturing, etc., or result in the forces of a combination of the above at the same time, leading to premature aging of the material, fading of images, damage to the adhesion of the adhesive, and damage to the structure of the tying device system. All the above-mentioned destructive forces will cause problems such as structural damage to the printed product, breaking the adhesion or tearing the waterproof fiber filaments. Examples are as follows.

1) The problem of sub-zero temperatures: A freezing temperature can solidify the liquid or moisture stored in the waterproof fiber filaments of the material and increase the total volume.
2) A condition in which a fluid evaporates into a steam or a gas: Such a temperature will weaken the structure, decompose or dissolve the adhesive and shorten the life cycle of the product.
3) A fluid environment: Under different flow rates of rolling fluids, destructive forces of rolling and physical friction may be caused.
4) An environment in which air abnormally moves: Under a flow rate of a randomly rolling gas, destructive forces of rolling and physical friction may be caused.

Figure 15:
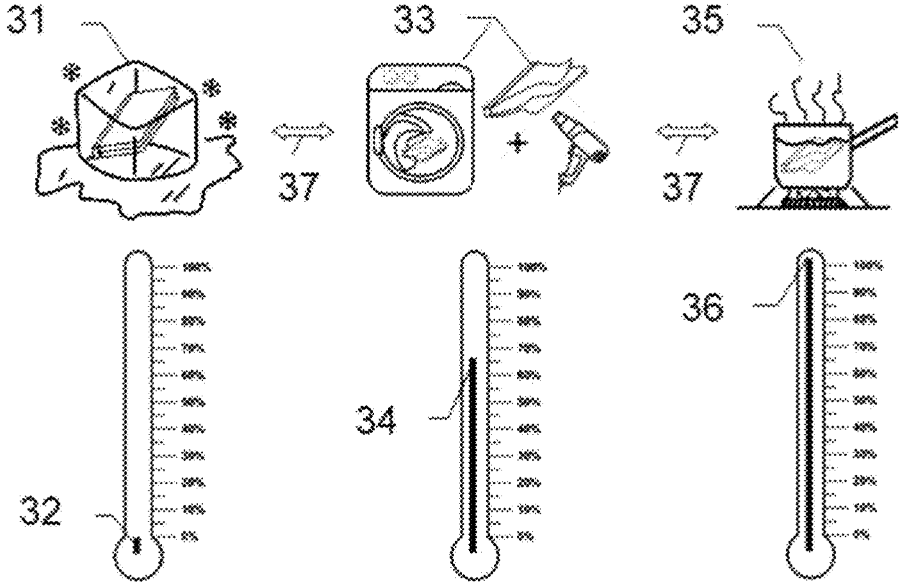
FIG. 15 shows a schematic diagram of testing that the printed product according to some embodiments of the present disclosure, when operating in all weather, being disinfected, and being washed, is not damaged under extreme temperatures and abnormal environmental conditions.

Referring to FIG. 15, in step S500 of some embodiments of the present disclosure, in all weather, extreme temperatures and abnormal environmental conditions, the printed product is not damaged when operating in all weather, being disinfected, and being washed. Washing and drying project 33 are performed under sub-zero 32 freezing conditions 31, at any temperature 34, and under a boiling condition 35 at a boiling temperature 36. The above process can be repeated 37.

The materials used for the printed product should exhibit the following bi-characteristics.

1) Rigidity: Lignin is extracted from high-fiber plants through fermentation. The lignin is rigid and is not easily affected by external factors which can destroy the adhesion of the lignin and thus leads to the decomposition of the fibrous structure. The preparing method of the printed product is generally as follows. Natural fibers such as cotton and wool are added into lignin to obtain waterproof fiber filaments or yarns. The waterproof fiber filaments or yarns exhibit characteristics of high rigidity and can resist physical destructive forces generated under abnormal environments and have a waterproof function.

2) Hydrophilicity: Because printing needs to be performed on the finished material, micro-pores are provided on the surface so that the pigment particles or the dye in the printing ink can penetrate between the waterproof fiber tissues of the material and solidify and fuse, permanently attach to the waterproof fiber filament tissues, thereby alleviating the problems that the printed images fade due to abnormal environments or the disinfection or washing environment. The finished product can be used for disinfection or washing projects, and a liquid used will not decompose the structure and the fiber tissues. Therefore, the sheet material is hydrophilic, and has a water resistance not enough for the material to be subjected to a pressure of more than 1,000 mm of water (9.8 kPa), so as to be suitable for the printing ink, a disinfectant and a detergent to penetrate through.

Referring again to FIG. 1, the manufacturing and quality testing method for a printed product capable of resisting abnormal environmental changes and operating in all weather and suitable for hygiene management operations according to the embodiments of the present disclosure also includes the following steps.

In Step S010, a material of the content component of the product is prepared. In this Step S010, in the process of preparing the material of the content component of the product, it is necessary to mix lignin with a waterproof chemical material to obtain a weather-resistant adhesive. In the process of preparing the material, the weather-resistant adhesive penetrates into the fiber filaments to produce waterproof and curing effects. Steps for preparing the bi-characteristic material are as follows, and the material of the content component of the product may be made by a bonding method or a weaving method.

1) Preparation by a Bonding Method i) Preparation of the weather-resistant waterproof adhesive: A conventional chemical waterproof adhesive used in the paper industry, including at least one of rubber, polyvinyl chloride (PVC), polyurethane (PU), silicone elastomer, fluoropolymer and wax waterproof material is used. Optionally, the chemical waterproof adhesive material includes at least one of rubber, polyvinyl chloride, polyurethane, silicone elastomer, fluoropolymer and a wax waterproof material. Then the chemical waterproof adhesive is mixed with gel-like fiber cell membrane of lignin and the resulting mixture is pulped to obtain the weather-resistant adhesive. A ratio of lignin to the chemical adhesive may range from 1% to 50%.

ii) The weather-resistant waterproof adhesive is a mixed with cross-linked waterproof fiber filaments (in particular natural fibers such as cotton and wool) to form a mixed pulp. During the mixing process, the weather-resistant waterproof adhesive also penetrates into the fiber filaments to achieve waterproof and rigid effects.

iii) The mixed pulp is subjected to high-temperature steaming and boiling, washing, bleaching, and drying in a traditional wood paper producing device. Finally, rough fiber filaments at the surface are pressed by a high-pressure method into a sheet material having a smooth surface for further printing. The sheet material has a thickness which ranges from 0.01 mm to 3 mm. In the pressing process, the pressure is required as such that the pressure should not press the surface to be absolutely smooth. The sheet material needs to have small holes of no less than 5 microns on the surface, so that the pigment particles or the dye in the printing ink can penetrate into the material through the small holes. Gaps between the fiber filament tissues are equivalent to capillary tubes, and under the capillary action, the pigment particles or the dye in the ink are automatically absorbed into between the fiber filaments by the surface tension of the capillary tubes, solidified, and permanently fused in the fiber tissues.

2) Preparation by a Weaving Method i) Special natural fibers such as cotton and wool are made into woven yarns by a traditional spinning method.

ii) The woven filaments are immersed into a container containing the above-mentioned weather-resistant adhesive. The lignin and the chemical waterproof adhesive penetrate between the fiber filament tissues and are then dried to obtain waterproof fiber threads.

iii) Finally, the waterproof fiber threads are woven into a smooth sheet material having a thickness ranging from 0.1 mm to 3 mm. This process does not include a pressing process, the pigment particles or the dye in the ink are automatically absorbed into between the fiber filaments by capillary action, solidified, and permanently fused in the fiber tissues.

In the project of connecting the weather-resistant content component of the product and the cover:

In the binding process, a material used in the binding to form the product may be an adhesive or a strong tying system. The material must meet the requirements of being capable of operating in all weather, being disinfected and washed, and being capable of resisting extreme conditions and abnormal environments without its functions being damaged. The standards for the material used in the binding process should be as follows.

1) The material used to bond the cover and the contents to produce the product is an irreversible adhesive. The contents are content component of the product. The curing process of the adhesive can only be a unidirectional chemical reaction, and the cured body can provide stable adhesion strength. The cured body should be flexible in terms of its physical state, is flexional, and cannot be reversely melted, or dissolved or the adhesion thereof can be reversed, which can result in disintegration of the material of the content component of the product.

2) In order to reinforce the strength of the irreversible adhesive, glass waterproof fiber filaments with a maximum length of 15 mm can be mixed into the adhesive, with a largest volume ratio of the waterproof glass fiber filaments to the adhesive being 50%, to increase the adhesive ability.

3) Used in the binding is a firm tying system structure, such as a metal or plastic wire comb, a spiral comb, a fastening tape, an adhesive tape, Velcro, a button, a zipper, or a rope, which is not physically decomposable.

Waterproof and weather-resistant images are formed on the sheet material of the content component of the product by an appropriate single-side or double-side printing method.

The ink for printing must be a highly penetrable pigment suspended in an aqueous or non-aqueous solution, or a dye mixed in an aqueous or non-aqueous solution, or the dye can be sublimated to the micro-pores on the surface of the sheet material, and then the ink liquid is automatically absorbed into between the waterproof fiber filament tissues by the surface tension of the capillary tubes, naturally solidified, or cooled down to be permanently fused in the fiber filament tissues. During the process, the ink is preheated to increase its fluidity, or sublimated and gasified, and then cooled to stably fuse. After the ink is dried, it enters a permanent solid state and a state of not being able to be reversely melted.

The used ink may be a pigment or a dye.

i) Pigments: solid pigments less than 5 microns.

ii) Dyes: color fluids.

The pigment particles or the dye, when under capillary action, can enter between the fiber filaments and become solidified and permanently fused in the fiber tissues to be used in all-weather operation, disinfection and sterilization, and washing and cleaning projects. Methods for drying the ink can be natural drying, oxidation, volatilization, ultraviolet solidification, thermal sublimation and cooling solidification, hot air, cold air, and traditional heating.

Figure 21:
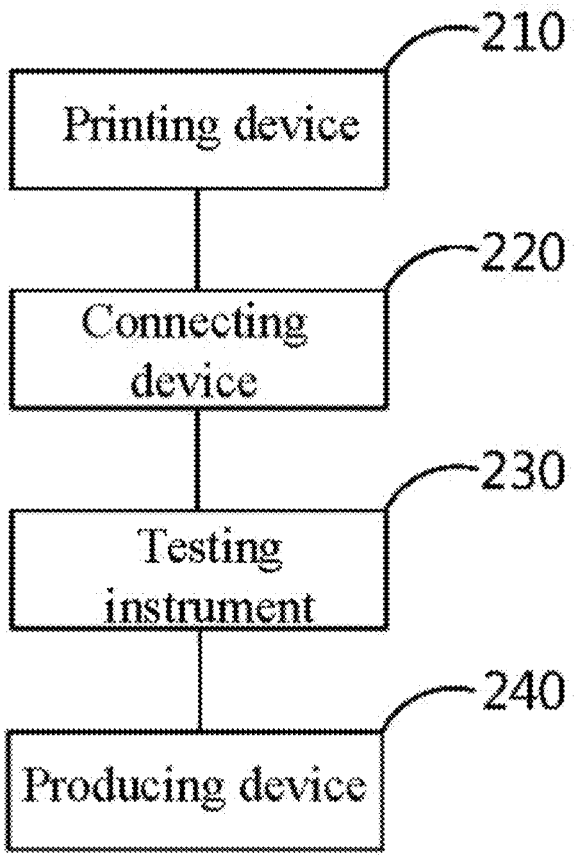
FIG. 21 shows a schematic block diagram showing a structure of a manufacturing device for a printed product according to some embodiments of the present disclosure.

Referring to FIG. 21, the embodiments of the present disclosure also provide a manufacturing device 20 for a printed product capable of resisting abnormal environmental changes and operating in all weather and suitable for hygiene management operations, which is used to implement the methods in the above-described embodiments. The manufacturing device 20 includes a printing device 210, a connecting device 220, a testing instrument 230, and a producing device 240.

The printing device 210 is used to perform the above-mentioned step S300. The connecting device 220 is used to perform the above-mentioned step S400. The testing instrument 230 is used to perform the above-mentioned step S500. The producing device 240 is used to prepare a sheet material and perform the above-mentioned Step S010. For specific details of performing the steps, please refer to the description of the above steps, which will not be repeated herein.

The producing device 240 for preparing the sheet material may be a paper machine or a weaving machine.

i) The manufacturing method in which a paper machine is used: First, waterproof fiber filaments and an adhesive containing lignin are mixed together to obtain a waterproof fiber pulp. Then the pulp is introduced onto a forming cloth or net of a paper-making device; the waterproof fiber filaments are interwoven with each other and water is removed by heating to obtain a solid sheet. Finally, the surface of the solid sheet is flattened by a pressure-adjustable drying roller. If the pressure of the drying roller is appropriate, the surface of the sheet material will not be rendered absolutely smooth but still has micro-pores, which meets the physical requirements of capillary action. It should be understood that, the paper machine is used to perform the steps of the method for manufacturing the sheet material using a paper machine.

ii) The manufacturing method using a weaving machine: Firstly, the waterproof fiber filaments are drawn into waterproof fiber yarns by a threading method, and the yarns are crisscrossed and woven into a sheet material by the weaving machine. The sheet material has a vertical density and a horizontal density that may be as small as micron distances, which meets the physical requirements of capillary action. It should be understood that the weaving machine is used to perform the steps of the method for manufacturing the sheet material using machine weaving machine.

Figure 17:
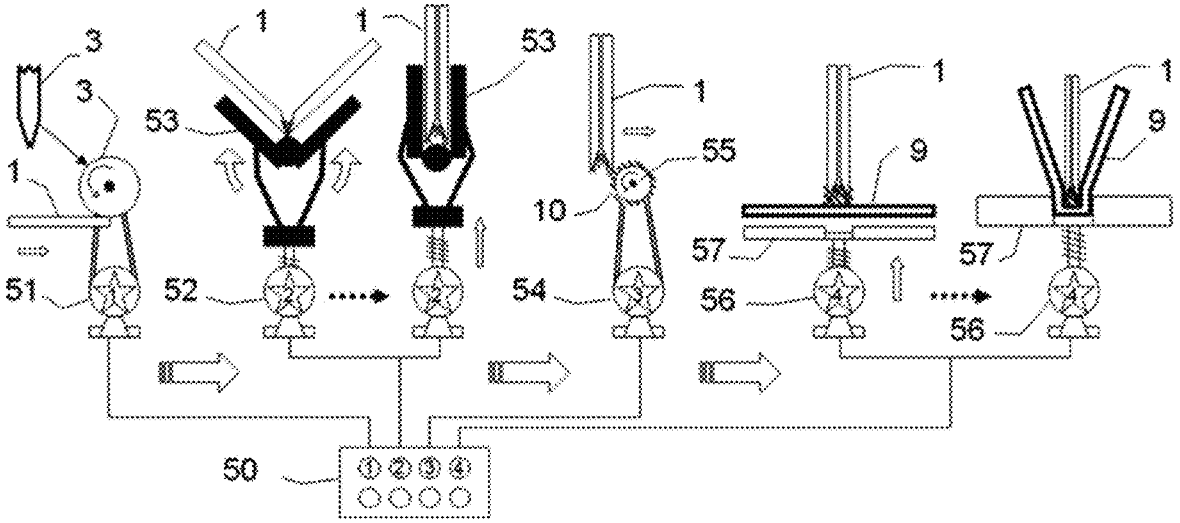
FIG. 17 shows a structural schematic diagram of producing devices included in a manufacturing device for a printed product according to some embodiments of the present disclosure.

Referring to FIG. 17, the connecting device 220 includes a console 50 for operating component machines, a cutting device, a folding device, a bonding device, and a picture book assembling device. The cutting device, the folding device, the bonding device, and the picture book assembling device are connected to the console 50 for operating component machines respectively. The cutting device is used to cut out slot-shaped openings or boundary holes on the sheet material. The folding device is used to fold the sheet material. The bonding device is used to apply the adhesive to the boundary holes on the sheet material. The picture book assembling device is used to assemble the sheet material and a cover together.

Further, the cutting device includes a punching mechanical unit 51 and a rotatable cutting wheel 3 that are connected to each other. The punching mechanical unit 51 is used to drive the rotatable cutting wheel 3 to cut the sheet material. Optionally, the rotatable cutting wheel 3 has a rough end 6. The folding device includes a folding mechanical unit 52 and a clamp 53 that are connected to each other. The folding mechanical unit 52 is used to drive the clamp 53 to perform folding. The bonding device includes an adhesive mechanical unit 54 and an adhesive roller 55 that are connected to each other. The adhesive mechanical unit 54 is used to drive the adhesive roller 55 to apply the adhesive 10 to the boundary holes on the sheet material of the contents 1 of the product. The picture book assembling device includes a picture book assembling mechanical unit 56 and a clamp table 57 that are connected to each other. The picture book assembling mechanical unit 56 is used to push the clamp table 57 to combine the sheet material of the contents 1 of the product with the cover 9 into one piece to complete a book-making process. The punching mechanical unit 51, the folding mechanical unit 52, the adhesive mechanical unit 54 and the picture book assembling mechanical unit 56 are connected to the console 50 for operating component machines respectively and work under the control of the console 50 for operating component machines.

Figure 16:
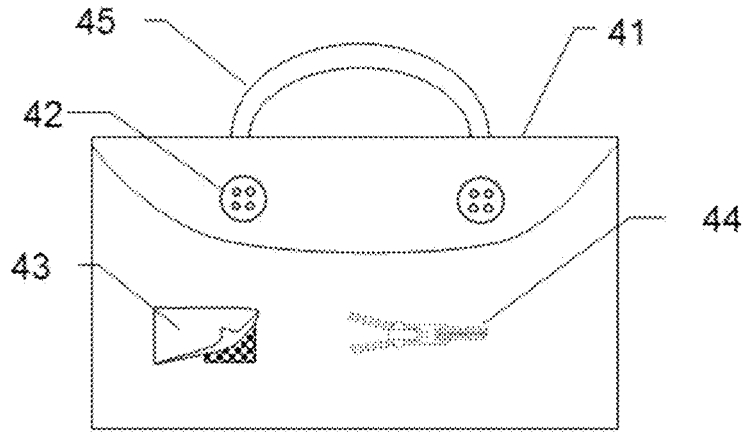
FIG. 16 shows a structural schematic diagram of a handbag designed by using the printed material of the printed product according to some embodiments of the present disclosure.

Referring to FIG. 16, the material of the printed product may be designed in the shape of a handbag 41. The handbag 41 has at least one of a button 42, a hook and loop tape 43, a zipper 44, and a handle 45. The material of the printed product may also be designed into packaging devices, clothes, and members with special functions attached to book covers and inner pages.

The embodiments of the present disclosure also provide a printed product manufactured by the above-described manufacturing and quality testing methods. The printed product is capable of resisting abnormal environmental changes and operating in all weather and is suitable for hygiene management operations.

The printed product according to the embodiments of the present disclosure may be mixed with an unconventional paper fiber material to prepare a product.

In summary, the core technology of the present disclosure is to produce a printed product that can resist extreme temperatures and abnormal environments and can operate in all weather. The product might be subjected to the following conditions when being used.

Temperature: freezing temperatures, hot air, boiling liquids, steam.

Environments: rolling and frictions caused by air turbulence or fluid turbulence in operating environments.

Materials: An all-weather material, namely an irreversible adhesive is used. Glass fiber filaments are used to reinforce the irreversible adhesive. A durable tying system is used.

Described above are merely specific embodiments of the present disclosure and the protection scope of the present disclosure is not limited to these specific embodiments. Any person skilled in the art can easily think of variations or substitutions within the technical scope disclosed in the present disclosure. All such variations or substitutions should be covered within the protection scope of the present disclosure. Therefore, the protection scope of the present disclosure should be subject to the protection scope of the claims.

INDUSTRIAL APPLICABILITY

In summary, the embodiments of the present disclosure provide a manufacturing method and a manufacturing device for a printed product capable of resisting abnormal environmental changes and operating in all weather and suitable for hygiene management operations as well as the printed product. Compared with traditionally synthesized waterproof papers requiring special processing and treatment and thus incurring an increased cost or compared with plastic products, the printed product is cheaper. The printed product is durable, conforms to the concept of environmental protection, and can be widely used in outdoor sports, industrial and commercial operations, toys in the bathing, cooking recipes, hygiene management services, etc. The printed product has competitive characteristics and performance. For example, it can resist extreme temperatures, abnormal environments, and is suitable for industrial applications or the structure of the product will not be damaged by destructive forces encountered during special works.

The invention claimed is:

1. A method for manufacturing a printed product capable of resisting abnormal environmental changes, and suitable for hygiene management operations, the method comprising:

providing a chemical waterproof adhesive, the chemical waterproof adhesive comprising at least one selected from a group consisting of rubber, polyvinyl chloride, polyurethane, silicone elastomer, fluoropolymer, and wax;

mixing the chemical waterproof adhesive with lignin to form a weather-resistant adhesive, the lignin being in the form of gel-like fiber cell membranes;

mixing the weather-resistant adhesive with waterproof fiber filaments to form a pulp;

processing the pulp with steaming, boiling, washing, bleaching and drying in a paper producing machine;

pressing the processed pulp by a pressure-adjustable roller to form a sheet material with micro-pores formed on both sides of the sheet material, the sheet material having a thickness ranging from 0.01 mm to 3 mm, and exhibiting printability characteristic;

forming waterproof and weather-resistant images on one or both sides of the sheet material by spraying or thermally transferring an ink or sublimating a dye on the sheet material, so that the ink or the sublimated dye penetrates through the micro-pores and fuses with the waterproof fiber filaments, the ink being selected from a group consisting of pigment particles suspended in an aqueous or non-aqueous solution, and a dye mixed in an aqueous or non-aqueous solution; and drying and solidifying the ink, or cooling and solidifying the sublimated dye to form a printed sheet material, wherein a ratio of the lignin to the chemical waterproof adhesive ranges from 1% to 50%, and the pigment particles have a dimension of less than 5 microns, and the micro-pores have a dimension of no less than 5 microns.

2. The method for manufacturing a printed product capable of resisting abnormal environmental changes, and suitable for hygiene management operations according to claim 1, further comprising:

folding the printed sheet material to form inner pages of a printed publication;

arranging the inner pages according to a reading sequence;

covering the inner pages with a cover; and binding the inner pages and the cover together by a binding process to form the printed publication, wherein the binding process is selected from a group consisting of adhering by a non-reversible adhesive and curing the non-reversible adhesive to form a cured body, sewing with a waterproof thread, fastening by a mechanical fastening assembly, and combinations thereof.

3. The method for manufacturing a printed product capable of resisting abnormal environmental changes, and suitable for hygiene management operations according to claim 1, further comprising:

determining a fold position of the printed sheet material to which a cover is to be connected;

cutting a plurality of slot-shaped openings or slit openings along the fold position with a rough end of a cutter, such that loose waterproof fiber filaments are exposed along edges of the plurality of slot-shaped openings or slit openings;

folding the printed sheet material along the fold position;

attaching the cover to the fold position and the loose waterproof fiber filaments of the printed sheet material by a non-reversible adhesive, and curing the non-reversible adhesive to formed a cured body; and cutting edges of the printed sheet material and the cover without the non-reversible adhesive to form a printed publication.

4. The method for manufacturing a printed product capable of resisting abnormal environmental changes, and suitable for hygiene management operations according to claim 1, further comprising:

providing one or more of the printed sheet materials with the images formed on one side of each printed sheet material;

folding each printed sheet material to form a folded sheet material in such a manner that the images are located on an inside of the folded sheet material;

arranging the one or more folded sheet materials according to a reading sequence;

applying a non-reversible adhesive on an outside of each folded sheet material without the images, and adhering the folded sheet materials together by the non-reversible adhesive; and adhering a cover to the outside of the adhered folded sheet materials applied with the non-reversible adhesive to form a printed publication.

5. The method for manufacturing a printed product capable of resisting abnormal environmental changes, and suitable for hygiene management operations according to claim 1, wherein the step of forming the images comprises one of a single-side printing method whereby the images are formed on one side of the sheet material, and a double-side printing method whereby the images are formed on both sides of the sheet material.

6. The method for manufacturing a printed product capable of resisting abnormal environmental changes, and suitable for hygiene management operations according to claim 1, further comprising:

cutting and forming an outline, a slot, a fastener, and a folding line on the printed sheet material by a cutting device;

folding the printed sheet material along the folding line; and inserting the fastener into the slot to form a three-dimensional model of the printed product.

7. The method for manufacturing a printed product capable of resisting abnormal environmental changes, and suitable for hygiene management operations according to claim 1, further comprising:

attaching the printed sheet material on top of at least one additional sheet material by a non-reversible adhesive to strengthen the printed sheet material; and cutting into or cutting through the printed sheet material and the at least one additional sheet material by a cutting device to form a knock out part.

8. The method for manufacturing a printed product capable of resisting abnormal environmental changes, and suitable for hygiene management operations according to claim 7, further comprising:

cutting and forming an outline, a slot, a fastener, and a folding line on the printed sheet material and the at least one additional sheet material by the cutting device;

folding the printed sheet material and the at least one additional sheet material along the folding line; and inserting the fastener into the slot to form a three-dimensional model of the printed product.

9. The method for manufacturing a printed product capable of resisting abnormal environmental changes, and suitable for hygiene management operations according to claim 1, wherein the step of drying the ink comprises a process selected from a group consisting of natural drying, oxidation, volatilization, ultraviolet solidification, hot air, and cold air.

10. A printed product capable of resisting abnormal environmental changes, and suitable for hygiene management operations, the printed product being made from the printed sheet material which is manufactured by the method according to claim 1.

11. The printed product capable of resisting abnormal environmental changes, and suitable for hygiene management operations according to claim 10, wherein the printed product is a reusable short-term writing tool on which text is adapted to be written with an ink that dissolves, melts, or vaporizes when placed at a temperature, including any temperature up to a water boiling temperature, when ironed by a hot iron, or when heated in a microwave oven.

12. The printed product capable of resisting abnormal environmental changes, and suitable for hygiene management operations according to claim 10, wherein the printed product is a handbag-shaped product.

* * * * *